US012783950B2

(12) United States Patent
Zhang et al.

(10) Patent No.: US 12,783,950 B2
(45) Date of Patent: Nov. 3, 2026

(54) FEDERATED LEARNING METHOD AND APPARATUS, DEVICE, SYSTEM, AND COMPUTER-READABLE STORAGE MEDIUM

(71) Applicant: Huawei Technologies Co., Ltd., Shenzhen (CN)

(72) Inventors: Yanfang Zhang, Shenzhen (CN); Qinglong Chang, Nanjing (CN); Jikun Ding, Nanjing (CN); Liang Zhang, Nanjing (CN); Xudong Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 744 days.

(21) Appl. No.: 18/325,533

(22) Filed: May 30, 2023

(65) Prior Publication Data

US 2023/0306311 A1 Sep. 28, 2023

Related U.S. Application Data

(63) Continuation of application No. PCT/CN2021/133579, filed on Nov. 26, 2021.

(30) Foreign Application Priority Data

Nov. 30, 2020 (CN) ......................... 202011385076.2

(51) Int. Cl.
*G06N 3/098* (2023.01)
*G06N 20/00* (2019.01)

(52) U.S. Cl.
CPC .................................... *G06N 20/00* (2019.01)

(58) Field of Classification Search
CPC ........ G06N 20/00; G06N 3/0464; G06N 3/09; G06N 3/098
See application file for complete search history.

(56) References Cited

U.S. PATENT DOCUMENTS

2019/0138934 A1* 5/2019 Prakash ................. G06N 20/00
2019/0354899 A1* 11/2019 Farchi ...................... G06N 5/02
(Continued)

FOREIGN PATENT DOCUMENTS

CN 111291897 A * 6/2020 ............. G06N 20/00
CN 111915023 A * 11/2020 ....... G06F 18/24155
(Continued)

OTHER PUBLICATIONS

Webank et al:"Federated Learning White Paper v2.0." Apr. 2020. total 48 pages.

(Continued)

*Primary Examiner* — Hassan Mrabi
(74) *Attorney, Agent, or Firm* — Conley Rose, P.C.

(57) ABSTRACT

A federated learning method includes: each second device in a plurality of second devices first obtains data distribution information and sends the data distribution information to a first device. The first device receives the data distribution information from the plurality of second devices participating in federated learning. The first device selects a matched federated learning policy based on the data distribution information. The first device sends a parameter reporting policy corresponding to the federated learning to at least one second device in the plurality of second devices. A second device that receives the parameter reporting policy is configured to obtain second gain information based on the parameter reporting policy and a current training sample, and the second gain information is for obtaining a second model of the second device.

20 Claims, 7 Drawing Sheets

(56) References Cited

U.S. PATENT DOCUMENTS

| | | | | |
|---|---|---|---|---|
| 2021/0065680 | A1* | 3/2021 | Audhkhasi | G10L 15/063 |
| 2021/0390492 | A1* | 12/2021 | Dhamija | G06N 3/045 |
| 2022/0006783 | A1* | 1/2022 | Hassanzadeh | H04L 63/0263 |
| 2022/0346132 | A1* | 10/2022 | Shen | G06F 9/5027 |
| 2022/0383132 | A1* | 12/2022 | Pastore | G06N 3/09 |
| 2023/0068386 | A1* | 3/2023 | Akdeniz | G06N 3/084 |
| 2023/0214666 | A1* | 7/2023 | Tsuchida | G06N 3/045<br>706/15 |
| 2023/0289656 | A1* | 9/2023 | Butt | G06N 20/00 |
| 2025/0209383 | A1* | 6/2025 | Hu | G06N 5/04 |

FOREIGN PATENT DOCUMENTS

| | | | | | |
|---|---|---|---|---|---|
| CN | 112272234 | B | * | 2/2023 | H04L 67/02 |
| CN | 111522669 | B | * | 1/2025 | G06N 3/08 |
| TW | 1798550 | B | * | 4/2023 | G06F 21/6245 |
| WO | WO-2020249125 | A1 | * | 12/2020 | G06N 20/20 |
| WO | WO-2021071399 | A1 | * | 4/2021 | G06N 3/0985 |
| WO | WO-2022099512 | A1 | * | 5/2022 | G06N 3/098 |

OTHER PUBLICATIONS

Jakub Konecn et al:"Federated Learning: Strategies for Improving Communication Efficiency." arXiv:1610.05492v1 [cs.LG] Oct. 18, 2016. total 5 pages.

Yue Zhao et al:"Federated Learning with Non-IID Data." arXiv:1806.00582v2 [cs.LG] Jul. 21, 2022. total 12 pages.

Qiang Yang et al:"Federated Machine Learning: Concept and Applications." arXiv:1902.04885v1 [cs.AI] Feb. 13, 2019. total 19 pages.

Sattler Felix et al: "On the Byzantine Robustness of Clustered Federated Learning", ICASSP 2020-2020 IEEE International Conference on Acoustics, Speech and Signal Processing (ICASSP), IEEE, May 4, 2020 (May 4, 2020), pp. 8861-8865, XP033794327.

Dimitrios Dimitriadis et al: "Federated Transfer Learning with Dynamic Gradient Aggregation", arxiv.org, Cornell University Library, 201 Olin Library Cornell University Ithaca, NY 14853, Aug. 6, 2020 (Aug. 6, 2020), XP081734775, total 9 pages.

* cited by examiner

FEDERATED LEARNING METHOD AND APPARATUS, DEVICE, SYSTEM, AND COMPUTER-READABLE STORAGE MEDIUM

CROSS-REFERENCE TO RELATED APPLICATIONS

This application is a continuation of International Patent Application No. PCT/CN2021/133579 filed on Nov. 26, 2021, which claims priority to Chinese Patent Application No. 202011385076.2 filed on Nov. 30, 2020. The disclosures of the aforementioned applications are hereby incorporated by reference in their entireties.

TECHNICAL FIELD

This present disclosure relates to the field of artificial intelligence technologies, and in particular, to a federated learning method and apparatus, a device, a system, and a computer-readable storage medium.

BACKGROUND

With continuous development of artificial intelligence technologies, federated learning, as an emerging artificial intelligence technology, has an increasingly wide application scope. Federated learning means that during machine learning, participants can use data from other parties to perform joint modeling. All parties do not need to share data resources. That is, when data is stored locally, data joint training is performed to establish a shared machine learning model.

In an application scenario of federated learning, data on each device is independently generated by the device/a user, and non-homologous data of different devices/users has different distribution features. When each device performs local learning, training data used by each device is non-independent and identically distributed (Non-IID). Therefore, for different data distribution situations, how to improve federated learning efficiency is of great significance to federated learning.

SUMMARY

This present disclosure provides a federated learning method and apparatus, a device, a system, and a computer-readable storage medium, to resolve a problem of poor flexibility and low efficiency of obtaining a model.

According to a first aspect, a federated learning method is provided. The method includes: a first device receives data distribution information sent by a plurality of second devices participating in federated learning. For any second device, the data distribution information sent by the any second device includes at least one of first gain information and label type information. The first gain information indicates a correction degree to a first model obtained through previous round of training to adapt to a current training sample of the any second device, and the label type information indicates a type corresponding to a label of the current training sample.

The first device selects a matched federated learning policy based on the data distribution information sent by the plurality of second devices. The first device sends a parameter reporting policy corresponding to the federated learning policy to at least one second device in the plurality of second devices. Any second device in the at least one second device is configured to report second gain information obtained based on the received parameter reporting policy and the current training sample, and the second gain information is for obtaining a second model of the any second device.

In the present disclosure, each second device participating in federated learning sends respective data distribution information to the first device, so that the first device can determine distribution situations of current training samples of different second devices based on the data distribution information, that is, learn of non-independent and identically distributed degrees of the current training samples of the different second devices. The first device selects a federated learning policy based on the non-independent and identically distributed degrees, and sends a corresponding parameter reporting policy to each second device based on the selected federated learning policy, so that each second device updates a model based on the federated learning policy. Therefore, interference caused to a federated learning process due to a non-independent and identically distributed phenomenon of training data between different second devices is avoided, and a model obtained by each second device through federated learning has good performance, for example, high accuracy.

In a possible implementation, the first device selects a matched federated learning policy based on the data distribution information sent by the plurality of second devices includes: the first device selects the matched federated learning policy based on a difference between data distribution, where the difference between the data distribution is determined based on the data distribution information sent by the plurality of second devices.

In a possible implementation, the data distribution information sent by the any second device includes the first gain information and the label type information, and before the first device selects the matched federated learning policy based on a difference between data distribution, the method further includes: the first device determines feature distribution information based on the first gain information of the plurality of second devices, where the feature distribution information indicates whether feature distribution of current training samples of different second devices is the same. The first device determines the difference between the data distribution based on the feature distribution information and the label type information of the plurality of second devices.

In a possible implementation, the first device selects the matched federated learning policy based on a difference between data distribution includes: based on the feature distribution information indicating that the feature distribution of the current training samples of the different second devices is the same, and the label type information of the different second devices is the same, the matched federated learning policy is selected as model average fusion, where the model average fusion is for performing federated learning in a gain information averaging manner.

In a possible implementation, the first device selects the matched federated learning policy based on a difference between data distribution includes: based on the feature distribution information indicating that the feature distribution of the current training samples of the different second devices is different, and the label type information of the different second devices is the same, the matched federated learning policy is selected as model differentiated update, where the model differentiated update is for performing federated learning in a gain information differentiated processing manner.

In a possible implementation, the first device selects the matched federated learning policy based on a difference between data distribution includes: based on the feature distribution information indicating that the feature distribution of the current training samples of the different second devices is the same, and the label type information of the different second devices is different, the matched federated learning policy is selected as model partial update, where the model partial update is for performing federated learning in a partial gain information averaging manner.

In a possible implementation, the first device selects the matched federated learning policy based on a difference between data distribution includes: based on the feature distribution information indicating that the feature distribution of the current training samples of the different second devices is different, and the label type information of the different second devices is different, the matched federated learning policy is selected as model partial differentiated update, where the model partial differentiated update is for performing federated learning in a partial gain information differentiated processing manner.

In a possible implementation, the data distribution information sent by the any second device includes the first gain information, and before the first device selects the matched federated learning policy based on a difference between data distribution, the method further includes: the first device determines feature distribution information based on the first gain information of the plurality of second devices, where the feature distribution information indicates whether feature distribution of current training samples of different second devices is the same. The first device determines the difference between the data distribution based on the feature distribution information.

In a possible implementation, the first device selects the matched federated learning policy based on a difference between data distribution includes: based on the feature distribution information indicating that the feature distribution of the current training samples of the different second devices is the same, the matched federated learning policy is selected as model average fusion, where the model average fusion is for performing federated learning in a gain information averaging manner.

In a possible implementation, the first device selects the matched federated learning policy based on a difference between data distribution includes: based on the feature distribution information indicating that the feature distribution of the current training samples of the different second devices is different, the matched federated learning policy is selected as model differentiated update, where the model differentiated update is for performing federated learning in a gain information differentiated processing manner.

In a possible implementation, the data distribution information sent by the any second device includes the label type information, and before the first device selects the matched federated learning policy based on a difference between data distribution, the method further includes: determining the difference between the data distribution based on the label type information.

In a possible implementation, the first device selects the matched federated learning policy based on a difference between data distribution includes: based on the label type information of different second devices is the same, the matched federated learning policy is selected as model average fusion, where the model average fusion is for performing federated learning in a gain information averaging manner.

In a possible implementation, the first device selects the matched federated learning policy based on a difference between data distribution includes: based on the label type information of different second devices is different, the matched federated learning policy is selected as model partial update, where the model partial update is for performing federated learning in a partial gain information averaging manner.

In a possible implementation, after the first device sends a parameter reporting policy corresponding to the federated learning policy to at least one second device in the plurality of second devices, the method further includes: the first device receives the second gain information sent by the plurality of second devices. The first device performs federated fusion on the second gain information based on the federated learning policy, to obtain third gain information corresponding to each second device. The first device sends, to the any second device in the at least one second device, the corresponding third gain information or the second model obtained based on the corresponding third gain information and a first model of the any second device.

In a possible implementation, before the first device sends a parameter reporting policy corresponding to the federated learning policy to at least one second device in the plurality of second devices, the method further includes: the first device receives training sample feature information sent by the plurality of second devices, where the training sample feature information represents label distribution or a sample quantity. The first device sends a parameter reporting policy corresponding to the federated learning policy to at least one second device in the plurality of second devices further includes: the first device sends, for the any second device in the at least one second device, a hyperparameter to the any second device, where the hyperparameter is determined based on the training sample feature information sent by the any second device, and the hyperparameter is used by the any second device to obtain the second gain information.

In a possible implementation, the training sample feature information includes label distribution information or the sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes a first model of the any second device, the first gain information includes gain information corresponding to the first model of the any second device, and the gain information corresponding to the first model of the any second device indicates a correction degree to the first model of the any second device to adapt to the current training sample of the any second device; or the first model obtained through the previous round of training includes a first model of the any second device and a first model of another second device participating in federated learning, the first gain information includes gain information corresponding to the first model of the any second device and gain information corresponding to the first model of the another second device, and the gain information corresponding to the first model of the another second device indicates a correction degree to the first model of the another second device to adapt to the current training sample of the any second device.

In a possible implementation, before the first device receives the data distribution information sent by the plurality of second devices participating in federated learning, the method further includes: the first device sends the first model of the another second device to the any second device.

According to a second aspect, a federated learning method is provided. The method includes: a second device obtains data distribution information, where the data distribution information includes at least one first gain information and label type information, the first gain information indicates a correction degree to a first model obtained through previous round of training to adapt to a current training sample of the second device, and the label type information indicates a type corresponding to a label of the current training sample. The second device sends the data distribution information to a first device, where the data distribution information is used by the first device to select a matched federated learning policy. The second device receives a parameter reporting policy that corresponds to the federated learning policy and that is sent by the first device, and obtains second gain information based on the receive parameter reporting policy and the current training sample, where the second gain information is for obtaining a second model of the second device.

In this present disclosure, each second device participating in federated learning sends respective data distribution information to the first device, so that the first device can determine distribution situations of current training samples of different second devices based on the data distribution information, that is, learn of non-independent and identically distributed degrees of the current training samples of the different second devices. The second device receives the corresponding parameter reporting policy sent by the first device to each second device based on the selected federated learning policy, so that the second device can report corresponding second gain information based on the parameter reporting policy, to implement model update. Therefore, interference caused to a federated learning process due to a non-independent and identically distributed phenomenon of training data between different second devices is avoided, and a model obtained by each second device through federated learning has good performance, for example, high accuracy.

In a possible implementation, after the second gain information is obtained based on the received parameter reporting policy and the current training sample, the method further includes: the second device sends the second gain information to the first device. The second device receives corresponding third gain information sent by the first device based on the second gain information, and the second device obtains the second model based on the third gain information and a first model of the second device; or the second device receives the second model that is sent by the first device and that is obtained based on corresponding third gain information and a first model of the second device.

In a possible implementation, the method further includes: the second device sends training sample feature information to the first device, where the training sample feature information is used by the first device to determine a hyperparameter. The second device receives the hyperparameter sent by the first device.

That the second gain information is obtained based on the received parameter reporting policy and the current training sample includes: the second device obtains the second gain information based on the received parameter reporting policy, the current training sample, and the hyperparameter.

In a possible implementation, the training sample feature information includes label distribution information or a sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes the first model of the second device, the first gain information includes gain information corresponding to the first model of the second device, and the gain information corresponding to the first model of the second device indicates a correction degree to the first model of the second device to adapt to the current training sample of the second device; or the first model obtained through the previous round of training includes the first model of the second device and a first model of another second device participating in federated learning, the first gain information includes gain information corresponding to the first model of the second device and gain information corresponding to the first model of the another second device, and the gain information corresponding to the first model of the another second device indicates a correction degree to the first model of the another second device to adapt to the current training sample of the second device.

In a possible implementation, before the second device obtains the data distribution information, the method further includes: the second device receives the first model of the another second device that is sent by the first device.

According to a third aspect, a federated learning apparatus is provided. The apparatus includes: a receiving module configured to receive, for a first device, data distribution information sent by a plurality of second devices participating in federated learning, where data distribution information sent by any second device includes at least one of first gain information and label type information, the first gain information indicates a correction degree to a first model obtained through previous round of training to adapt to a current training sample of the any second device, and the label type information indicates a type corresponding to a label of the current training sample; a selection module configured to select, for the first device, a matched federated learning policy based on the data distribution information sent by the plurality of second devices; and a sending module configured to send, for the first device, a parameter reporting policy corresponding to the federated learning policy to at least one second device in the plurality of second devices, where any second device in the at least one second device is configured to report second gain information obtained based on the received parameter reporting policy and the current training sample, and the second gain information is for obtaining a second model of the any second device. In a possible implementation, the selection module is configured to select, for the first device, the matched federated learning policy based on a difference between data distribution, where the difference between the data distribution is determined based on the data distribution information sent by the plurality of second devices.

In a possible implementation, the data distribution information sent by the any second device includes the first gain information and the label type information, and the apparatus further includes: a first determining module configured to determine, for the first device, feature distribution information based on the first gain information of the plurality of second devices, where the feature distribution information indicates whether feature distribution of current training samples of different second devices is the same; and determine, for the first device, the difference between the data distribution based on the feature distribution information and the label type information of the plurality of second devices.

In a possible implementation, the selection module is configured to: based on the feature distribution information indicating the feature distribution of the current training samples of the different second devices is the same, and the label type information of the different second devices is the same, select the matched federated learning policy as model average fusion, where the model average fusion is for performing federated learning in a gain information averaging manner.

In a possible implementation, the selection module is configured to: based on the feature distribution information indicating that the feature distribution of the current training samples of the different second devices is different, and the label type information of the different second devices is the same, select the matched federated learning policy as model differentiated update, where the model differentiated update is for performing federated learning in a gain information differentiated processing manner.

In a possible implementation, the selection module is configured to: based on the feature distribution information indicating that the feature distribution of the current training samples of the different second devices is the same, and the label type information of the different second devices is different, select the matched federated learning policy as model partial update, where the model partial update is for performing federated learning in a partial gain information averaging manner.

In a possible implementation, the selection module is configured to: based on the feature distribution information indicating that the feature distribution of the current training samples of the different second devices is different, and the label type information of the different second devices is different, select the matched federated learning policy as model partial differentiated update, where the model partial differentiated update is for performing federated learning in a partial gain information differentiated processing manner.

In a possible implementation, the data distribution information sent by the any second device includes the first gain information, and the apparatus further includes: a second determining module configured to: determine, for the first device, feature distribution information based on the first gain information of the plurality of second devices, where the feature distribution information indicates whether feature distribution of current training samples of different second devices is the same; and determine, for the first device, the difference between the data distribution based on the feature distribution information.

In a possible implementation, the selection module is configured to: based on the feature distribution information indicating that the feature distribution of the current training samples of the different second devices is the same, select the matched federated learning policy as model average fusion, where the model average fusion is for performing federated learning in a gain information averaging manner.

In a possible implementation, the selection module is configured to: based on the feature distribution information indicating that the feature distribution of the current training samples of the different second devices is different, select the matched federated learning policy as model differentiated update, where the model differentiated update is for performing federated learning in a gain information differentiated processing manner.

In a possible implementation, the apparatus further includes: a third determining module configured to determine the difference between the data distribution based on the label type information.

In a possible implementation, the selection module is configured to: based on the label type information of different second devices is the same, select the matched federated learning policy as model average fusion, where the model average fusion is for performing federated learning in a gain information averaging manner.

In a possible implementation, the selection module is configured to: based on the label type information of different second devices is different, select the matched federated learning policy as model partial update, where the model partial update is for performing federated learning in a partial gain information averaging manner.

In a possible implementation, the receiving module is further configured to receive, for the first device, the second gain information sent by the plurality of second devices; the apparatus further includes: a fusion module configured to perform, for the first device, federated fusion on the second gain information based on the federated learning policy, to obtain third gain information corresponding to each second device; and the sending module is further configured to send, for the first device to the any second device in the at least one second device, the corresponding third gain information or the second model obtained based on the corresponding third gain information and a first model of the any second device.

In a possible implementation, the receiving module is further configured to receive, for the first device, training sample feature information sent by the plurality of second devices, where the training sample feature information represents label distribution or a sample quantity; and the sending module is further configured to send, for the first device for the any second device in the at least one second device, a hyperparameter to the any second device, where the hyperparameter is determined based on the training sample feature information sent by the any second device, and the hyperparameter is used by the any second device to obtain the second gain information.

In a possible implementation, the training sample feature information includes label distribution information or the sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes the first model of the any second device, the first gain information includes gain information corresponding to the first model of the any second device, and the gain information corresponding to the first model of the any second device indicates a correction degree to the first model of the any second device to adapt to the current training sample of the any second device; or the first model obtained through the previous round of training includes the first model of the any second device and a first model of another second device participating in federated learning, the first gain information includes gain information corresponding to the first model of the any second device and gain information corresponding to the first model of the another second device, and the gain information corresponding to the first model of the another second device indicates a correction degree to the first model of the another second device to adapt to the current training sample of the any second device.

In a possible implementation, before the first device receives the data distribution information sent by the plurality of second devices participating in federated learning, the sending module is further configured to send, for the first device, the first model of the another second device to the any second device.

According to a fourth aspect, a federated learning apparatus is provided. The apparatus includes: an obtaining module configured to obtain, for a second device, data distribution information, where the data distribution information includes at least one of first gain information and label type information, the first gain information indicates a correction degree to a first model obtained through previous round of training to adapt to a current training sample of the second device, and the label type information indicates a type corresponding to a label of the current training sample; a sending module configured to send, for the second device, the data distribution information to a first device, where the data distribution information is used by the first device to select a matched federated learning policy; and a receiving module configured to receive, for the second device, a parameter reporting policy that corresponds to the federated learning policy and that is sent by the first device, and obtain second gain information based on the received parameter reporting policy and the current training sample, where the second gain information is for obtaining a second model of the second device.

In a possible implementation, the sending module is further configured to send, for the second device, the second gain information to the first device; and the receiving module is further configured to receive, for the second device, corresponding third gain information sent by the first device based on the second gain information, and obtain, for the second device, the second model based on the third gain information and a first model of the second device; or receive, for the second device, the second model that is sent by the first device and that is obtained based on corresponding third gain information and a first model of the second device.

In a possible implementation, the sending module is further configured to send, for the second device, training sample feature information to the first device, where the training sample feature information is used by the first device to determine a hyperparameter; and the receiving module is further configured to receive, for the second device, the hyperparameter sent by the first device, and obtain the second gain information based on the received parameter reporting policy, the current training sample, and the hyperparameter.

In a possible implementation, the training sample feature information includes label distribution information or a sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes the first model of the second device, the first gain information includes gain information corresponding to the first model of the second device, and the gain information corresponding to the first model of the second device indicates a correction degree to the first model of the second device to adapt to the current training sample of the second device; or the first model obtained through the previous round of training includes the first model of the second device and a first model of another second device participating in federated learning, the first gain information includes gain information corresponding to the first model of the second device and gain information corresponding to the first model of the another second device, and the gain information corresponding to the first model of the another second device indicates a correction degree to the first model of the another second device to adapt to the current training sample of the second device.

In a possible implementation, the receiving module is further configured to receive, for the second device, the first model of the another second device that is sent by the first device.

According to a fifth aspect, a communication device is provided. The device includes a communication interface and a processor. Optionally, the communication device further includes a memory. The communication interface, the memory, and the processor communicate with each other through an internal connection path. The memory is configured to store instructions. The processor is configured to execute the instructions stored in the memory, to control the communication interface to receive a signal, and control the communication interface to send a signal. When the processor executes the instructions stored in the memory, the processor is enabled to perform the method according to the first aspect or any possible implementation of the first aspect.

According to a sixth aspect, a communication device is provided. The device includes a communication interface and a processor. Optionally, the communication device further includes a memory. The communication interface, the memory, and the processor communicate with each other through an internal connection path. The memory is configured to store instructions. The processor is configured to execute the instructions stored in the memory, to control the communication interface to receive a signal, and control the communication interface to send a signal. When the processor executes the instructions stored in the memory, the processor is enabled to perform the method according to the second aspect or any possible implementation of the second aspect.

Optionally, there are one or more processors, and there are one or more memories.

Optionally, the memory and the processor may be integrated together, or the memory and the processor may be separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this present disclosure.

According to a seventh aspect, a communication system is provided. The system includes a first communication device and a second communication device. The first communication device is configured to perform the federated learning method according to the first aspect or any possible implementation of the first aspect, and the second communication device is configured to perform the federated learning method according to the second aspect or any possible implementation of the second aspect.

According to an eighth aspect, a computer program product is provided. The computer program product includes computer program code, and when the computer program code is run by a computer, the computer is enabled to perform the methods according to the foregoing aspects.

According to a ninth aspect, a computer-readable storage medium is provided. The computer-readable storage medium stores a program or instructions. When the program or the instructions are run on a computer, the methods according to the foregoing aspects are performed.

According to a tenth aspect, a chip is provided. The chip includes a processor configured to invoke, from a memory, and run instructions stored in the memory, so that a communication device in which the chip is installed performs the methods according to the foregoing aspects.

According to an eleventh aspect, another chip is provided. The chip includes an input interface, an output interface, a processor, and a memory. The input interface, the output interface, the processor, and the memory are connected through an internal connection path. The processor is configured to execute code in the memory, and when the code is executed, the processor is configured to perform the methods according to the foregoing aspects.

DESCRIPTION OF EMBODIMENTS

Terms used in an implementation part of the present disclosure are merely used to explain embodiments of the present disclosure, and are not intended to limit the present disclosure. The following describes embodiments of the present disclosure with reference to the accompanying drawings.

With the development and improvement of the artificial intelligence (AI) technology, the AI technology gradually attracts wide attention in various fields. The AI technology depends on a learning process of a large amount of label data. However, in an actual application, an object holding a data source usually faces a problem of insufficient label data volume in the data source. In addition, it is difficult for different objects to share the data source due to a type limitation of the data source and privacy protection. As a result, the AI technology faces a problem of "data island" in an actual application.

Figure 1:
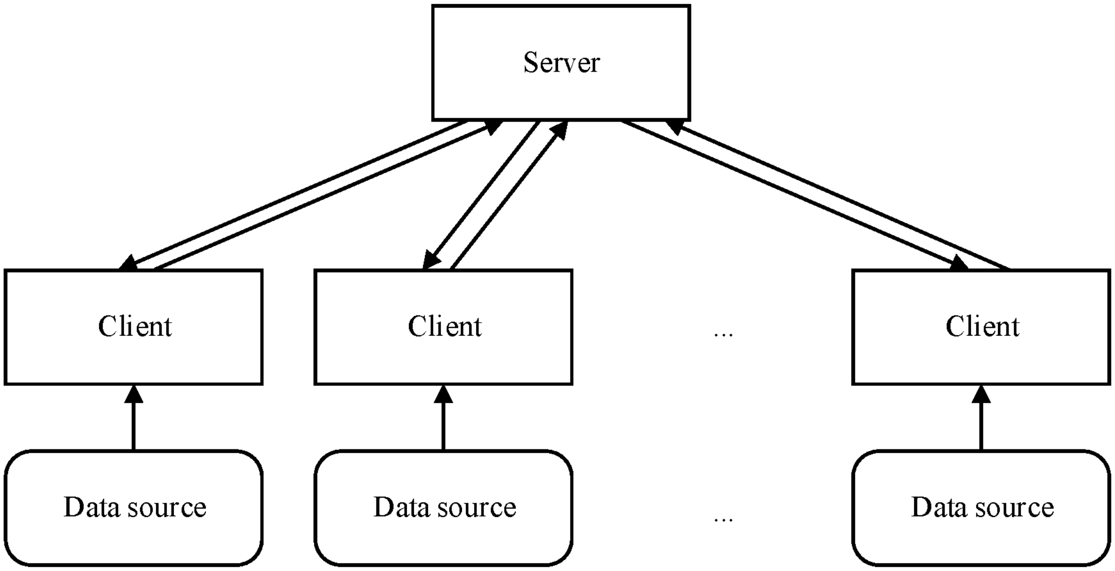
FIG. 1 is a schematic diagram of federated learning according to an embodiment of the present disclosure.

To solve this problem, federated learning emerges. In a federated learning process, a plurality of objects that each hold a data source separately serve as participants, so that the data sources of the plurality of participants are combined to train a machine learning model while it is ensured that data does not go out of a domain, and the plurality of participants can share the machine learning model. Refer to FIG. 1. FIG. 1 shows a federated learning architecture, including N clients and a server, where each client is communicatively connected to the server. The client is in a one-to-one correspondence with a participant of federated learning, and the client performs model training in a domain through a data source provided by the participant. Then, a model training result is uploaded to the server. The server obtains a shared machine learning model based on the model training result uploaded by each client, and delivers the shared machine learning model to each client for use.

In an ideal state, training data used for training the machine learning model complies with an independent and identically distributed (IID) principle. However, in an actual application, label data in each data source is usually non-independent and has a strong correlation with other factors (inter-dependent), and the label data between different data sources usually has different probability distribution, so that the training data in the federated learning process complies with a non-independent and identically distributed (non-IID) principle. How to ensure accuracy of the machine learning model when the training data complies with the non-IID principle, and avoid a negative case such as that the machine learning model cannot be converged, is of great significance to the federated learning process.

Figure 2:
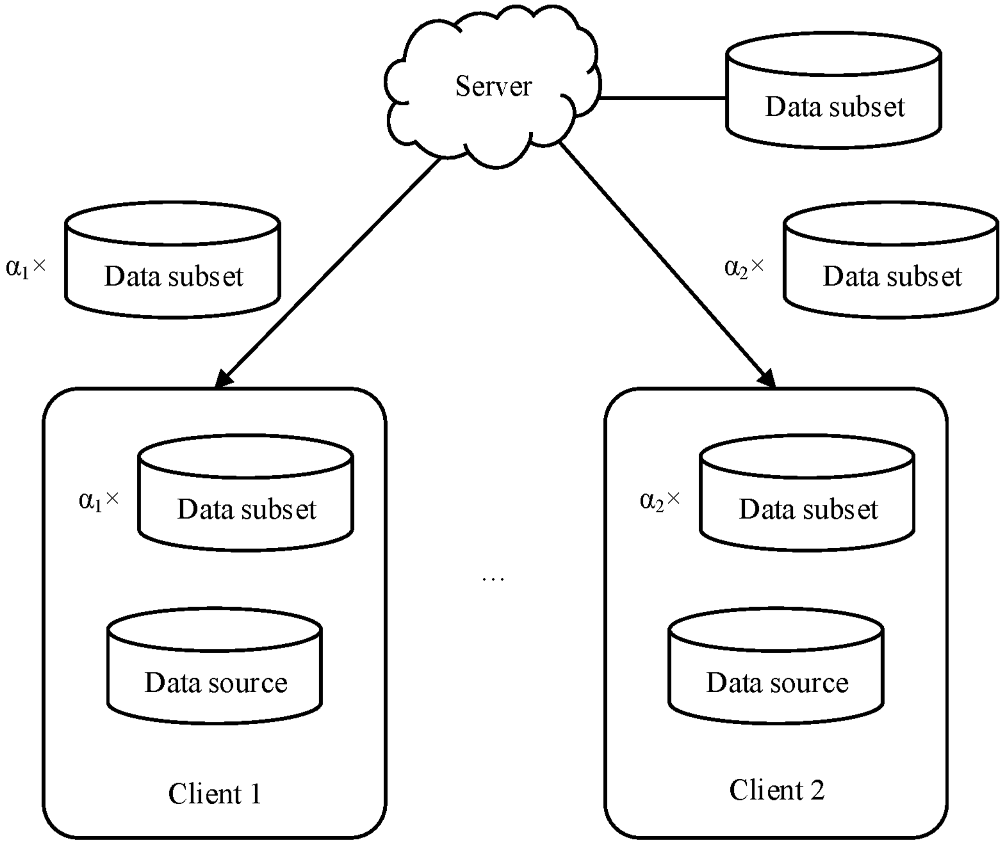
FIG. 2 is a schematic diagram of federated learning in a related technology according to an embodiment of the present disclosure.

A related technology provides a data-sharing federated learning method. Refer to FIG. 2. In this method, a server manages a label data set having unified probability distribution, and the server obtains a data subset from the label data set and trains a model based on the data subset. The model trained by the server is configured to determine a weight of each client, and the server delivers a data subset to each client based on the determined weight. For example, in FIG. 2, a weight of a client 1 is $\alpha_1$, and a weight of a client 2 is $\alpha_2$. Then, each client performs model training based on the data subset with a weight and an intra-domain data source, and uploads a model training result to the server. The server obtains a shared machine learning model based on the model training result uploaded by each client.

However, in an actual application, it is usually difficult to obtain a label data set having unified probability distribution. As a result, the method provided in the related technology exists only at a theoretical level, and is difficult to implement and apply.

Figure 3:
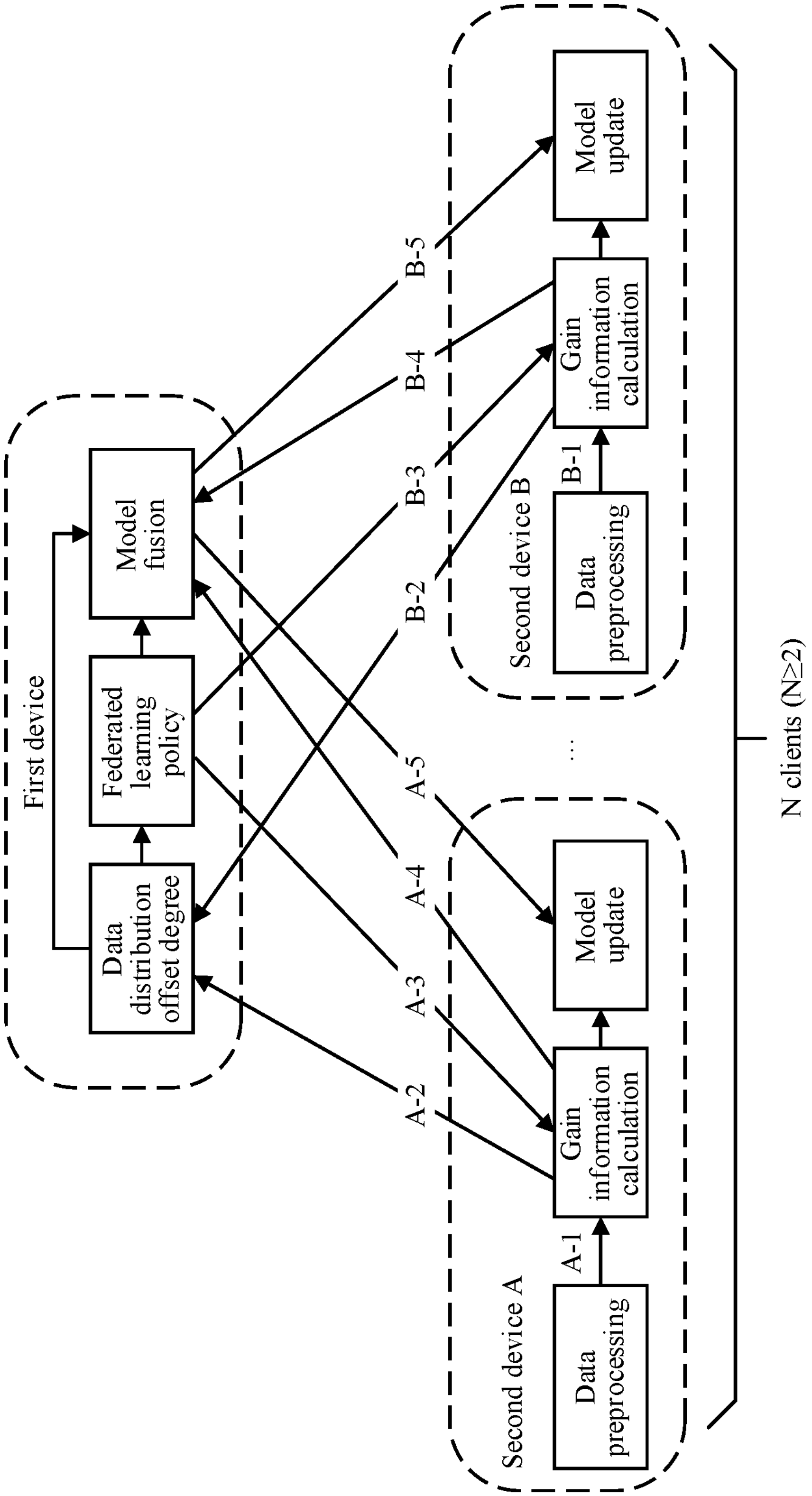
FIG. 3 is a schematic architectural diagram of a federated learning system according to an embodiment of the present disclosure.

An embodiment of the present disclosure provides a federated learning method. The method can be applied to a federated learning system shown in FIG. 3. FIG. 3 includes a first device and N second devices (N≥2), and each second device is communicatively connected to the first device. The first device is configured to serve as a server (also referred to as a central node) in a federated learning process, and the second device is configured to serve as a client (also referred to as an edge node) in the federated learning process. The first device includes a data distribution offset module, a joint learning policy module, and a model updating module, and each second device includes a gain information calculation module and a model updating module. The modules shown in FIG. 3 are described as follows:

The gain information calculation module is configured to obtain first gain information through calculation based on a current training sample, where the first gain information is used by the first device to select a federated learning policy. The gain information calculation module is further configured to obtain second gain information through calculation based on a parameter reporting policy corresponding to the federated learning policy and a corresponding training sample, where the second gain information is used by the first device to perform federated fusion.

The model updating module is configured to update, based on the first gain information or the second gain information obtained by the gain information calculation module, a model obtained by each second device in a previous round of training process.

Optionally, the second device further includes a data preprocessing module configured to perform preprocessing on a sample included in the current training sample, to obtain a preprocessed sample. For example, the preprocessing includes but is not limited to data complementing and feature extraction. The gain information calculation module is configured to obtain the first gain information through calculation based on the preprocessed sample. The gain information calculation module is further configured to obtain the second gain information through calculation based on the parameter reporting policy corresponding to the federated learning policy and the preprocessed sample.

The data distribution offset module is configured to determine feature distribution of current training samples of different second devices based on the first gain information of the second devices.

The joint learning policy module is configured to select a matched federated learning policy based on the feature distribution of the current training samples of the different second devices.

The model fusion module is configured to perform federated fusion based on the federated learning policy and the second gain information of the different second devices, to obtain third gain information corresponding to each second device. The model fusion module is configured to send the third gain information to the corresponding second device, so that the second device obtains a second model of the second device based on the third gain information; or obtain a second model based on the third gain information and a first model of the corresponding second device, and send the second model to the corresponding second device.

Based on the functions of the modules in the foregoing descriptions, refer to FIG. 3, the second device A completes a federated learning process through A-1, A-2, A-3, A-4, and A-5 sequentially. In addition, a process in which another second device completes federated learning is the same as the process in which the second device A completes federated learning. For example, the second device B shown in FIG. 3 completes a federated learning process through B-1, B-2, B-3, B-4, and B-5 shown in FIG. 3 sequentially.

Figure 4:
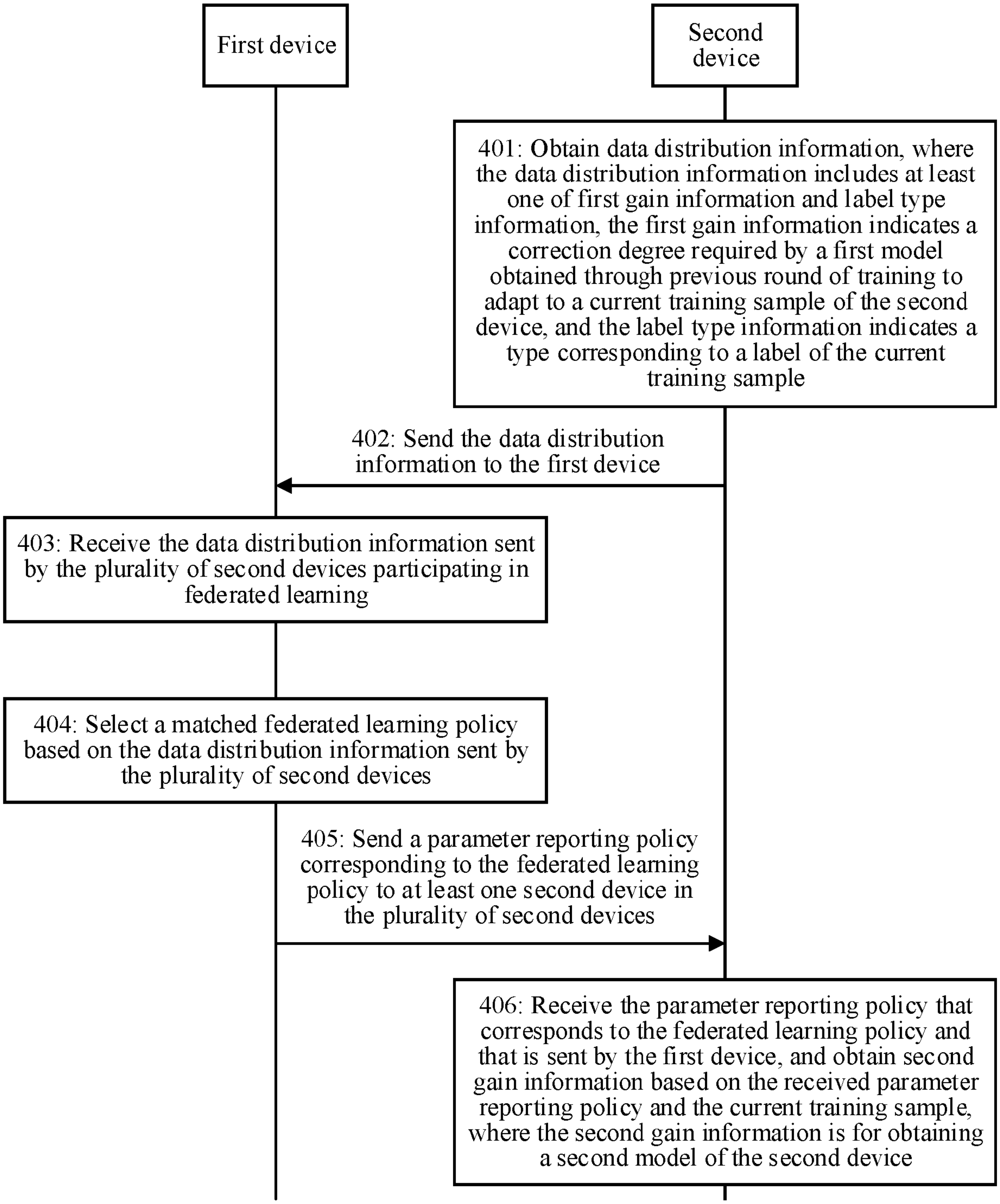
FIG. 4 is a flowchart of a federated learning method according to an embodiment of the present disclosure.

Based on the implementation environment shown in FIG. 3, an embodiment of the present disclosure provides a federated learning method. For example, the federated learning method is implemented through interaction between the first device and the second device. Refer to FIG. 4, the method includes the following process.

401: The second device obtains data distribution information, where the data distribution information includes at least one of first gain information and label type information, the first gain information indicates a correction degree to a first model obtained through previous round of training to adapt to a current training sample of the second device, and the label type information indicates a type corresponding to a label of the current training sample.

Federated learning is jointly participated by the first device and a plurality of second devices, and federated learning usually includes a plurality of rounds of training processes. An execution time of 401 is located between any two adjacent rounds of training processes in the plurality of rounds of training processes. For ease of description, in the specification, a round of training process that has ended when 401 is performed is referred to as a previous round of training process, and a round of training process that has not started when 401 is performed is referred to as a current training process.

For any second device, before a current round of training, the second device receives a model delivered by the first device, and the second device obtains a first model of the second device based on the model. The first model is used as the first model obtained through the previous round of training. In addition, the second device has a corresponding training sample, that is, a current training sample, in a current round of training process. A manner of obtaining the current training sample by the second device is not limited in embodiments of the present disclosure. For example, after the previous round of training ends, a training sample corresponding to the second device in the previous round of training may change, so that the training sample corresponding to the second device is updated from the training sample in the previous round of training to the current training sample. For example, a new sample is added to the training sample in the previous round of training to form the current training sample. For example, a new training sample is obtained for the current round of training as the current training sample. It should be understood that both the training sample in the previous round of training and the current training sample include a plurality of samples corresponding to labels, that is, each sample includes a label. Correspondingly, in the current training process, the second device needs to retrain, based on the current training sample, the first model corresponding to the second device. Before retraining is performed, the second device performs 401 to obtain data distribution information. The data distribution information is used by the first device to obtain a federated learning policy, so that the second device can perform retraining based on the federated learning policy in the current training process.

For example, the data distribution information includes at least one of first gain information and label type information. The following separately describes the first gain information and the label type information.

First gain information: The first gain information sent by the second device indicates a correction degree to the first model obtained through the previous round of training to adapt to the current training sample of the second device.

The second device is any second device participating in federated learning. For example, the first model obtained through the previous round of training includes the first model of the second device, the first gain information includes gain information corresponding to the first model of the second device, and the gain information corresponding to the first model of the second device indicates a correction degree to the first model of the second device to adapt to the current training sample of the second device.

Alternatively, the first model obtained through the previous round of training includes the first model of the second device and a first model of another second device participating in federated learning, the first gain information includes gain information corresponding to the first model of the second device and gain information corresponding to the first model of the another second device, and the gain information corresponding to the first model of the another second device indicates a correction degree to the first model of the another second device to adapt to the current training sample of the second device.

The first gain information is a running result obtained by running the current training sample on the first model. In an actual application, a calculation process of the gain information corresponding to the first model of the second device is used as an example. A plurality of samples included in the current training sample are separately input into the first model of the second device, to obtain a plurality of output results. Based on a loss function corresponding to the first model and the plurality of output results, a function value of the loss function is calculated, gain information of each model parameter included in the first model of the second device is determined based on the function value, and the gain information of each model parameter is determined as the gain information corresponding to the first model of the second device. For a manner of obtaining the gain information corresponding to the first model of the another second device, refer to the foregoing manner of calculating the gain information corresponding to the first model of the second device.

For example, regardless of the first model of the second device or the first model of the another second device, if the first model is a neural network model, the first gain information is gradient information. In addition, in this embodiment, an error backpropagation algorithm can be used when the first gain information is determined based on the function value of the loss function. Alternatively, if the first model is a decision tree model, the first gain information is split information. The decision tree model includes a plurality of nodes, each node other than a node at a bottom layer corresponds to a decision condition and two branches, and each branch includes at least one sample. For example, if a decision condition of a node in the decision tree model is 0.8, a sample less than 0.8 in the samples included in the current training sample belongs to one branch corresponding to the node, and a sample not less than 0.8 belongs to another branch corresponding to the node. Correspondingly, the split information is a decision condition corresponding to each node and a quantity of samples included in a branch corresponding to each node.

It should be noted that, when the first model used by the second device includes the first model of the another second device in the previous round of training process, the method provided in this embodiment further includes: For any second device, the first device sends a first model of the any second device to a second device other than the any second device in the plurality of second devices. Correspondingly, the second device receives the first model that is sent by the first device and that is of the another second device participating in federated learning.

For example, the second device participating in federated learning includes a device A, a device B, and a device C. In this case, the first device sends a first model of the device B and a first model of the device C to the device A, the first device sends a first model of the device A and the first model of the device C to the device B, and the first device sends the first model of the device A and the first model of the device B to the device C.

For example, when the first device stores the first model corresponding to each second device, the first device may directly send the first model based on a requirement of each second device. Alternatively, when the first device does not store the first model corresponding to each second device, each second device uploads the first model of the second device to the first device, and then the first device sends the first model based on a requirement of each second device. In consideration of security, before sending a first model corresponding to one second device to another second device, the first device first applies to the second device corresponding to the to-be-sent first model for permission, and sends the first model after obtaining authorization. For example, if the first device needs to send the first model of the device B to the device A, the first device applies to the device B for delivery permission of the first model of the device B, and after obtaining authorization from the device B, sends the first model of the device B to the device A.

It should be understood that the first models of the second devices may be the same or different. If the first models of the second devices are the same, it is clear that a waste of resources is caused when the first device separately sends the first model of another second device to each second device. Therefore, in this embodiment, when first models of different second devices are different, the first device sends the first models.

Label type information: The label type information indicates a type corresponding to a label of the current training sample. The plurality of samples included in the current training sample each have a label, and the label of the current training sample is a label of each sample included in the current training sample. The type corresponding to the label of the current training sample is a type of the label of each sample in the current training sample. For example, the label type information indicates that the label of the current training sample corresponds to three types: A, B, and C. That is, the label of the current training sample includes three types of labels: A, B, and C. In this case, it indicates that the samples included in the current training sample of the second device have three types of labels: A, B, and C, and a quantity of labels of each type is not limited.

For example, the label of the current training sample indicates whether an identification result is abnormal. There are two types corresponding to the label of the current training sample, where one type of label indicates that the identification result is abnormal, and the other type of label indicates that the identification result is normal.

402: The second device sends the data distribution information to the first device.

After each second device separately obtains the data distribution information, each second device separately sends the data distribution information to the first device, so that the first device selects a matched federated learning policy based on the data distribution information sent by each second device.

403: The first device receives the data distribution information sent by the plurality of second devices participating in federated learning.

Because each second device participating in federated learning sends the data distribution information to the first device, the first device can receive the data distribution information sent by the plurality of second devices participating in federated learning.

404: The first device selects a matched federated learning policy based on the data distribution information sent by the plurality of second devices.

In an example embodiment, the first device selects the matched federated learning policy based on the data distribution information sent by the plurality of second devices includes: the first device selects the matched federated learning policy based on a difference between data distribution, where the difference between the data distribution is determined based on the data distribution information sent by the plurality of second devices. It can be learned from the descriptions in 401 that the data distribution information includes at least one of the first gain information and the label type information. When the data distribution information includes different information, manners of selecting the federated learning policy are also different. The following separately describes various manners involved in a selection process.

Manner A1: The data distribution information includes gain information and the label type information. Correspondingly, before the first device selects the matched federated learning policy based on a difference between data distribution, the method further includes: the first device determines feature distribution information based on the first gain information of the plurality of second devices, where the feature distribution information indicates whether feature distribution of current training samples of different second devices is the same. The first device determines the difference between the data distribution based on the feature distribution information and the label type information of the plurality of second devices. It can be learned from the descriptions in 401 that, for any second device, a first model used in a process in which the second device obtains the first gain information may be the first model of the second device, or may further include the first model of the another second device.

In a case that the first gain information includes the gain information corresponding to the first model of the second device, if a distance between first gain information of two second devices is less than a threshold, it indicates that feature distribution of current training samples of the two second devices is the same. For example, the first gain information obtained by running the device A on the first model A of the device A is d1A, and the first gain information obtained by running the device B on the first model B of the device B is d2B. If a distance (d1A, d2B) between d1A and d2B is less than the threshold, it indicates that the feature distribution of the current training samples of the device A and the device B is the same.

In a case that the first gain information includes the gain information corresponding to the first model of the second device and the gain information corresponding to the first model of the another second device, if a distance between first gain information obtained by running two second devices on the first model corresponding to the other party is less than a threshold, it indicates that feature distribution of current training samples of the two second devices is the same. For example, the first gain information obtained by running the device A on the first model B of the device B is d2A, and the first gain information obtained by running the device B on the first model A of the device A is d1B. If a distance (d2A, d1B) between d2A and d1B is less than the threshold, it indicates that the feature distribution of the current training samples of the device A and the device B is the same.

It should be understood that, when there are at least three second devices, for two second devices that have same feature distribution of current training samples, a distance between first gain information obtained by running the two second devices on the first model of the other party needs to be less than a threshold, and a distance between first gain information obtained by running the two second devices on another same first model other than the first model of the other party needs to be less than the threshold. For example, the second device participating in federated learning further includes the device C, the first gain information obtained by running the device A on the first model C of the device C is d3A, and the first gain information obtained by running the device B on the first model of the device C is d3B. In this case, when both the distance between (d2A, d1B) and a distance (d3A, d3B) are less than the threshold, it is considered the feature distribution of the current training samples of the device A and the device B is the same.

If a distance between first gain information obtained by running two second devices on a first model of a same second device is less than a threshold, it indicates that feature distribution of current training samples of the two second devices is the same. For example, the first model of the device A is A, and the first model of the device B is B. The first gain information obtained by running the device A on the first model A and the first model B is d1A and d2A respectively, and the first gain information obtained by running the device B on the first model A and the first model B is d1B and d2B respectively. If a distance (d1A, d1B) between the first gain information d1A and d1B obtained by running the device A and the device B on the same first model A is less than the threshold, and a distance (d2A, d2B) between the first gain information d2A and d2B obtained by running the device A and the device B on the same first model B is less than the threshold, it indicates that the feature distribution of the current training samples of the device A and the device B is the same.

It should be noted that a process of determining whether feature distribution is the same is transitive between different second devices. For example, if it is determined, according to the manner in the foregoing descriptions, that the feature distribution of the current training samples of the device A and the device B is the same, and it is determined that the feature distribution of the current training samples of the device B and the device C is the same, it indicates that the feature distribution of the current training samples of the device A, the device B, and the device C is the same. When a large quantity of second devices participating in federated learning, a probability that current training samples of all second devices have same feature distribution is usually low. However, all the second devices can include at least one group of second devices whose current training samples have a same feature part. For example, if a quantity of second devices participating in federated learning is 10, feature distribution of current training samples of devices 1 to 5 may be the same, feature distribution of current training samples of devices 6 to 10 may be the same, and the feature distribution of the current training samples of the devices 1 to 5 and the feature distribution of the current training samples of the devices 6 to 10 may be different.

In the foregoing process of determining the feature distribution, a distance between different first gain information needs to be determined. It can be learned from the descriptions of the first gain information in 401 that the first gain information includes gain information of each model parameter in the first model. For example, for first gain information of two second devices, a sub-distance between gain information of corresponding model parameters in the first gain information is first obtained, to obtain a plurality of sub-distances. Then, weighted summation is performed on the plurality of sub-distances, and an obtained weighted summation value is determined as a distance between the first gain information of the two second devices.

When the first gain information is gradient information and the first model is a neural network model, the first model includes a convolution layer, a sampling layer, a fully connected layer, and the like. For example, model parameters of a same type of layer correspond to each other. For example, in the first gain information of the device A and the device B, model parameters that belong to the convolution layer are model parameters corresponding to each other, and model parameters that belong to the sampling layer are model parameters corresponding to each other. In addition, different types of layers correspond to a same weight or different weights according to an actual requirement. For example, for any type of layer, a weight of a sub-distance obtained through calculation based on gain information of a model parameter of the type of layer is equal to a weight corresponding to the any type of layer.

In a case that the first gain information is split information and the first model is a decision tree model, nodes in the decision tree model include a root node and a plurality of leaf nodes, and the leaf nodes are located at different levels. The root node or leaf nodes at a same level correspond to each other. Weights corresponding to the root node and leaf nodes are the same or different. For example, in this embodiment, a weight corresponding to the root node is the largest, and a leaf node at a lower layer corresponds to a smaller weight.

After determining the feature distribution information, the first device selects the matched federated learning policy based on the difference between the data distribution. For example, in this embodiment, the federated learning policy is selected according to a procedure shown in FIG. 5, and a selection process includes but is not limited to the following four cases.

Case 1. Based on the feature distribution information indicating that the feature distribution of the current training samples of the different second devices is the same, and that the label type information of the different second devices is the same, the matched federated learning policy is selected as model average fusion, where the model average fusion is for performing federated learning in a gain information averaging manner. Gain information is second gain information reported by the second devices to the first device based on a parameter reporting policy corresponding to the model average fusion. For the second gain information, refer to descriptions in a case B1 below. In other words, the first device is configured to: after receiving the second gain information uploaded by the second devices, calculate an average value of the received second gain information based on the model average fusion federated learning policy.

Case 2. Based on the feature distribution information indicating that the feature distribution of the current training samples of the different second devices is different, and that the label type information of the different second devices is the same, the matched federated learning policy is selected as model differentiated update, where the model differentiated update is for performing federated learning in a gain information differentiated processing manner. For the gain information, refer to the descriptions in the foregoing case 1. The first device is configured to: after receiving the gain information uploaded by the second devices, perform differentiated processing on the gain information based on the model differentiated update federated learning policy. For a process of the differentiated processing, refer to descriptions in a case C2 below.

Case 3. Based on the feature distribution information indicating that the feature distribution of the current training samples of the different second devices is the same, and that the label type information of the different second devices is different, the matched federated learning policy is selected as model partial update, where the model partial update is for performing federated learning in a partial gain information averaging manner. The partial gain information is second gain information reported by the second devices to the first device based on a parameter reporting policy corresponding to the model partial update. For the second gain information, refer to descriptions in a case B3 below. The first device is configured to: after receiving the second gain information, perform average calculation on the received partial gain information based on the model partial update federated learning policy.

Case 4. Based on the feature distribution information indicating that the feature distribution of the current training samples of the different second devices is different, and that the label type information of the different second devices is different, the matched federated learning policy is selected as model partial differentiated update, where the model partial differentiated update is for performing federated learning in a partial gain information differentiated processing manner. For the partial gain information, refer to the descriptions in a case 3. For a process of the differentiated processing, refer to descriptions in a case C4 below. Details are not described herein.

The selected federated learning policy is used by the first device to deliver a corresponding parameter reporting policy to the second devices. If the selected federated learning policy differs, the parameter reporting policy sent by the first device to the second devices also differs. For details, refer to descriptions in 406 below. It should be understood that the four federated learning policies shown in FIG. 5 are merely examples, and are not for limiting the federated learning policy.

Figure 5:
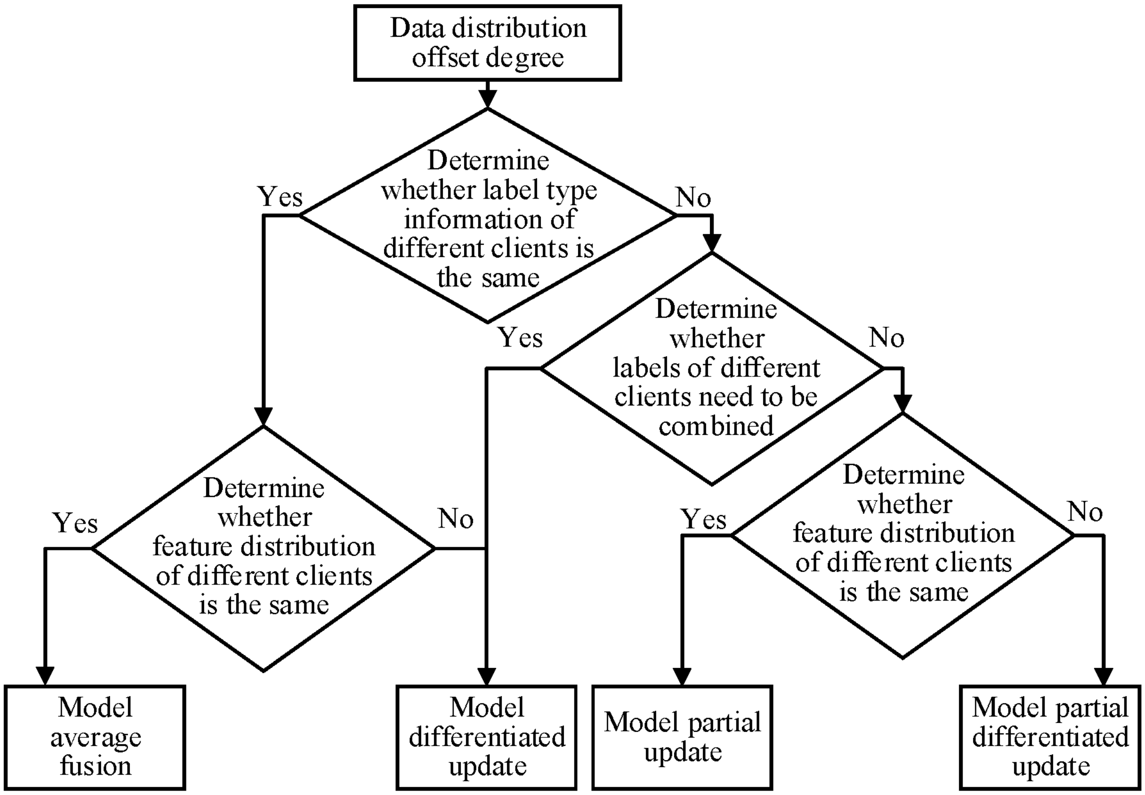
FIG. 5 is a schematic flowchart of selecting a federated learning policy according to an embodiment of the present disclosure.

In addition, it can be learned from FIG. 5 that, based on the label type information of the different second devices is different, in this embodiment, before it is determined whether the feature distribution of the current training samples of the different second devices is the same, it is first determined, according to an actual requirement or experience, whether labels of the current training samples of the different second devices need to be combined. If the labels of the current training samples of the different second devices do not need to be combined, it is further determined whether the feature distribution of the current training samples of the different second devices is the same. If the labels of the current training samples of the different second devices need to be combined, the matched federated learning policy is directly selected as the model differentiated update.

Manner A2: The data distribution information includes the first gain information. Correspondingly, before the first device selects the matched federated learning policy based on a difference between data distribution, the method further includes: the first device determines feature distribution information based on the first gain information of the plurality of second devices, where the feature distribution information indicates whether feature distribution of current training samples of different second devices is the same. The first device determines the difference between the data distribution based on the feature distribution information. That the first device selects the matched federated learning policy based on a difference between data distribution includes but is not limited to the following two cases.

Case 1. Based on the feature distribution information indicating that the feature distribution of the current training samples of the different second devices is the same, the matched federated learning policy is selected as model average fusion.

Case 2. Based on the feature distribution information indicating that the feature distribution of the current training samples of the different second devices is different, the matched federated learning policy is selected as model differentiated update.

For a process in which the first device determines the feature distribution information, refer to the descriptions in the foregoing manner A1. In a case that the data distribution information includes only the first gain information and does not include the label type information, in this embodiment, it is equivalent to that the label type information of the different second devices is the same by default. In this way, when the feature distribution of the current training samples of the different second devices is the same, the matched federated learning policy selected based on FIG. 5 is the model average fusion. Correspondingly, when the feature distribution information indicates that the feature distribution of the current training samples of the different second devices is different, the matched federated learning policy selected based on FIG. 5 is the model differentiated update.

Manner A3: The data distribution information includes the label type information. Correspondingly, the data distribution information sent by the any second device includes the label type information, and before the first device selects the matched federated learning policy based on a difference between data distribution, the method further includes: determining the difference between the data distribution based on the label type information.

In a case that the data distribution information includes only the label type information and does not include the first gain information, in this embodiment, it is considered by default that the first gain information of the different second devices is the same. Therefore, when the label type information of the different second devices is the same, the matched federated learning policy selected based on FIG. 5 is the model average fusion. Correspondingly, when the label type information of the different second devices is different, the matched federated learning policy selected based on FIG. 5 is the model partial update.

405: The first device sends a parameter reporting policy corresponding to the federated learning policy to at least one second device in the plurality of second devices.

After selecting the federated learning policy, the first device determines, based on the determined federated learning policy, a parameter reporting policy corresponding to each second device, and sends, to each second device, the parameter reporting policy corresponding to the federated learning policy corresponding to each second device, so that the second device can obtain the second gain information based on the corresponding parameter reporting policy and the current training sample.

In an example embodiment, in addition to sending the data distribution information to the first device, each second device further sends training sample feature information to the first device, where the training sample feature information represents label distribution or a sample quantity, and the training sample feature information is used by the first device to determine a hyperparameter. Correspondingly, the first device sends a parameter reporting policy corresponding to the federated learning policy to the plurality of second devices further includes: for any second device in the at least one second device to which the parameter reporting policy is sent, the first device determines a hyperparameter based on the training sample feature information sent by the any second device, and sends the hyperparameter to the any second device, where the hyperparameter is used by the any second device to obtain the second gain information. For a process in which the second device applies the hyperparameter, refer to 406 in the following, and details are not described herein.

For example, the training sample feature information includes label distribution information or the sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample. For example, if the current training sample includes 100 pieces of labeled data in total, the quantity of samples is 100. The label proportion information indicates a percentage of the labels of each type in the labels of the current training samples. For example, among 100 samples, 30 samples have a label A, 50 samples have a label B, and 20 samples have a label C. In this case, a quantity of labels of the label A is 30, a quantity of labels of the label B is 50, a quantity of labels of the label C is 20, a proportion of labels of the label A is 30%, a proportion of labels of the label B is 50%, and a proportion of labels of the label C is 20%.

After obtaining the training sample feature information, the first device further determines the hyperparameter. In a case that the training sample feature information includes the label distribution information, and the label distribution information includes the label proportion information, the first device determines a hyperparameter corresponding to the labels of each type in the current training sample of the any second device, and sends the determined hyperparameter to the second device. For a label of any type, larger label proportion information of the label indicates a smaller hyperparameter corresponding to the label. For example, if the labels of the current training samples include a label A that accounts for 80% and a label B that accounts for 20%, a hyperparameter corresponding to the label A is less than a hyperparameter corresponding to the label B.

Alternatively, in a case that the training sample feature information includes the sample quantity, the first device determines the hyperparameter for each second device based on sample quantities corresponding to different second devices. A larger sample quantity corresponding to any second device indicates a smaller hyperparameter of the second device. For example, if a sample quantity of a device A is 100 and a sample quantity of a device B is 10000, a hyperparameter of the device A is greater than a hyperparameter of the device B. In addition, in a case that the label distribution information includes both the label proportion information and the quantity of labels of each type, refer to the descriptions of the label proportion information, which is not described herein again.

If the foregoing manners of determining the hyperparameter are not used, in a subsequent model training process, compared with a training result obtained based on a sample with a large volume (with large label proportion information and large data volume information), a training result obtained based on a sample with a small volume (with small label proportion information and small data volume information) is eliminated as noise. As a result, it is difficult for a sample with a small volume to contribute to the subsequent model training process. In this embodiment, a large hyperparameter is configured for a sample with a small volume, so that samples with different volumes in the current training sample of each second device can contribute to the subsequent model training process. In this way, it is ensured that a model obtained through training by using the federated learning process has good performance.

406: The second device receives the parameter reporting policy that corresponds to the federated learning policy and that is sent by the first device, and obtains second gain information based on the received parameter reporting policy and the current training sample, where the second gain information is for obtaining a second model of the second device.

It can be learned from the descriptions in 401 that, an execution time of 401 is between a previous round of training process and a current training process, and 406 is the current training process. In other words, after receiving the federated learning policy sent by the first device, the second device formally starts training based on the federated learning policy. In the current training process, for any second device, the second device obtains second gain information based on the parameter reporting policy corresponding to the received federated learning policy and a current training sample of the second device, where the second gain information includes gain information of at least one model parameter.

Four different federated learning policies are illustrated in 404. A process of obtaining the second gain information by the second device varies as the federated learning policy varies. The following separately describes four cases of obtaining the second gain information by using cases B1 to B4.

Case B1. The federated learning policy is model average fusion. In this case, the second device receives a parameter reporting policy that corresponds to the model average fusion and that is sent by the first device, and the second device obtains the second gain information based on the parameter reporting policy and the current training sample. For example, for the model average fusion federated learning policy, the second device needs to report gain information of all model parameters. Therefore, the first device delivers, to the second device, a parameter reporting policy for obtaining the gain information of all the model parameters.

Case B2. The federated learning policy is model differentiated update. In this case, the parameter reporting policy delivered by the first device is the same as that in the case B1, and a process of obtaining the second gain information by the second device is the same as that in the case B1. Details are not described again.

Case B3. The federated learning policy is model partial update. In the case B3, the parameter reporting policy that corresponds to the federated learning policy and that is sent by the first device to the second device indicates the second device to report gain information of some model parameters. In this case, the second gain information obtained by the second device may include gain information of only some model parameters. A neural network model is used as an example. A convolution layer, a sampling layer, and the like in the neural network model belong to a feature extraction layer, and a fully connected layer belongs to a classification layer. The second device may train only the feature extraction layer by using the current training sample, and does not train the classification layer. In addition, the second device may also perform training in a manner described in the case B1, to obtain gain information of all model parameters, and then select gain information of some model parameters from the gain information of all the model parameters as the second gain information.

Case B4. The federated learning policy is model partial differentiated update. In this case, the parameter reporting policy delivered by the first device is the same as that in the case B3, and a process of obtaining the second gain information by the second device is the same as that in the case B3. Details are not described again.

It can be learned from the descriptions of the calculation process of the first gain information in 401 that, after inputting each sample of the current training sample into the first model of the second device, the second device obtains an output result corresponding to each sample. In a case that the second device receives, in addition to the parameter reporting policy corresponding to the federated learning policy, the hyperparameter sent by the first device, that the second device obtains the second gain information based on the received parameter reporting policy and the current training sample of the second device includes: obtaining the second gain information based on the received parameter reporting policy, the current training sample, and the hyperparameter. For different manners of determining the hyperparameter, manners of obtaining the second gain information by the second device are different, for example, including but not limited to the following two cases.

Case 1. In a case that the hyperparameter is determined by the first device based on the label distribution information, the second device determines, based on the hyperparameter, a weight corresponding to each sample, so as to perform weighted summation on an output result corresponding to each sample, to obtain a weighted summation value. The second device calculates a function value of a loss function based on the loss function and the weighted summation value, so as to obtain the second gain information.

For example, the second device determines, based on the hyperparameter, a weight corresponding to each sample includes: for any sample, determining a label corresponding to the sample, and using a hyperparameter corresponding to the label as the weight of the sample. For example, the labels of the current training samples of the second device include a label A that accounts for 80% and a label B that accounts for 20%, and a hyperparameter M of the label A is less than a hyperparameter N of the label B. If the label of the sample is the label A, the weight corresponding to the sample is equal to the hyperparameter M of the label A.

Case 2. In a case that the hyperparameter is determined by the first device based on the sample quantity, because hyperparameters of different second devices vary with the sample quantity, after obtaining the gain information of the at least one model parameter through calculation, the second device updates the gain information of the at least one model parameter based on the hyperparameter, for example, performs calculation such as product, and uses an update result as the second gain information.

Figure 6:
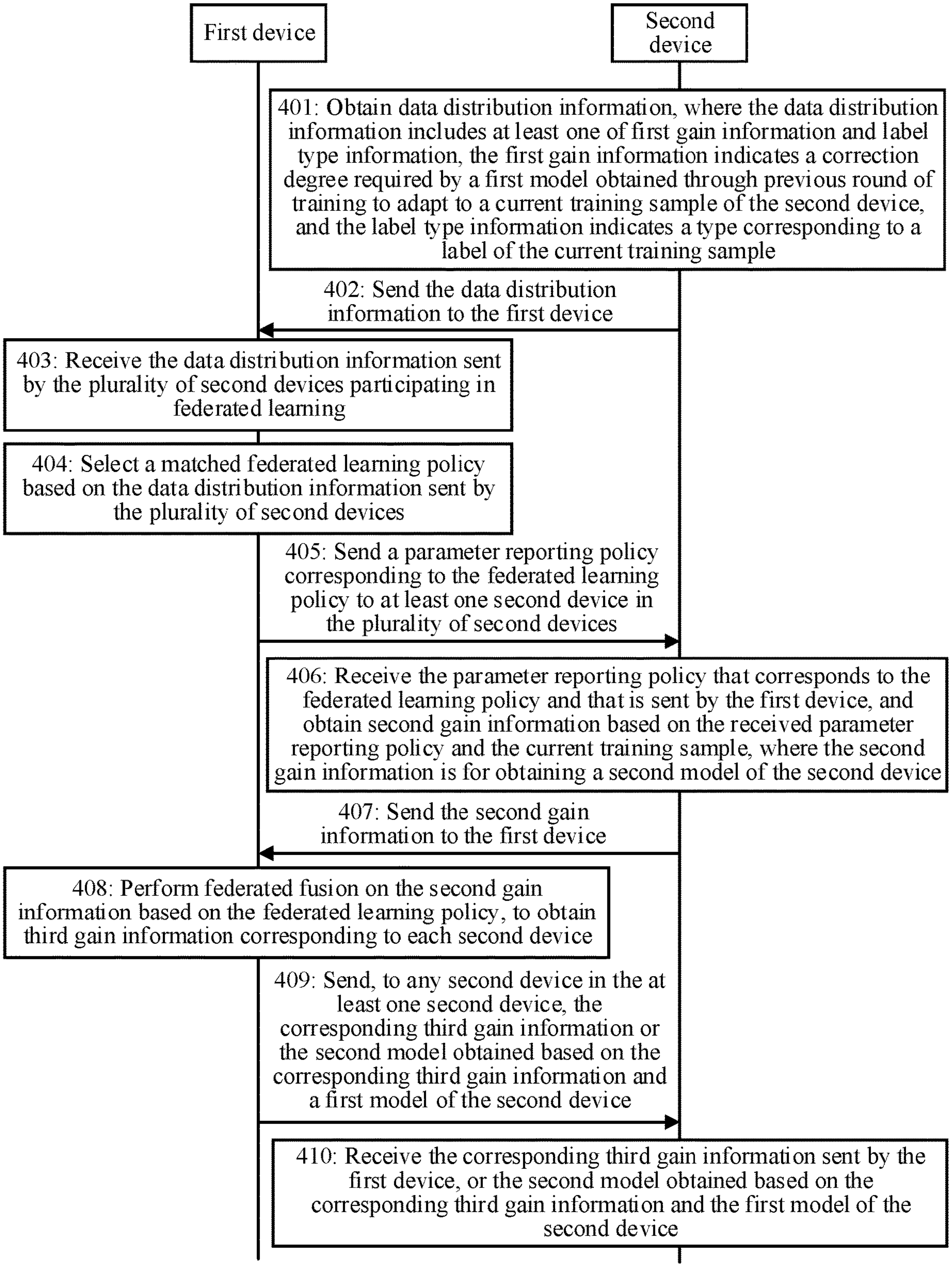
FIG. 6 is a schematic flowchart of federated learning according to an embodiment of the present disclosure.

In an example embodiment, refer to FIG. 6, after the second device obtains the second gain information, the method provided in this embodiment further includes the following process.

407: The second device sends the second gain information to the first device.

For example, each second device participating in federated learning reports the obtained second gain information to the first device.

408: The first device receives the second gain information sent by the plurality of second devices, and performs federated fusion on the second gain information based on the federated learning policy, to obtain third gain information corresponding to each second device.

After obtaining the second gain information, the first device performs federated fusion on the second gain information based on the federated learning policy, so as to obtain the third gain information corresponding to each second device. If the federated learning policy varies, a manner in which the first device obtains, through federated fusion, the third gain information corresponding to each second device also varies. The following provides descriptions by using cases C1 to C4.

Case C1. The federated learning policy is model average fusion. In this case, the first device calculates an average value of the second gain information sent by each second device on which the model average fusion is performed, to obtain the third gain information corresponding to each second device on which the model average fusion is performed.

Case C2. The federated learning policy is model differentiated update. The first device performs weighted summation on the second gain information sent by each second device on which the model differentiated update is performed, and weights of different second devices are the same or different, so as to obtain the third gain information corresponding to each second device on which the model differentiated update is performed. Alternatively, the first device performs incremental learning on the second gain information sent by each second device on which the model differentiated update is performed. In an incremental learning process, the first device first updates the second gain information sent by one second device, to obtain a first update result. The first device updates the first update result based on the second gain information sent by another second device, to obtain a second update result. In this type, a finally obtained update result is used as third incremental information corresponding to each second device on which the model differentiated update is performed. For example, an incremental learning manner used in this embodiment includes updating by using a Mondrian tree.

Case C3. The federated learning policy is model partial update. In the case C3, because the second gain information sent by the second device is gain information of some model parameters in all model parameters, the first device may directly calculate an average value of the gain information of the some model parameters included in the second gain information reported by the second device on which the model partial update is performed. In the case C1, the first device is equivalent to performing federation on the entire second model of each second device on which the model average fusion is performed. In the case C3, the first device performs federation on a part of the second model of each second device on which the model partial update is performed.

Case C4. The federated learning policy is model partial differentiated update. In this case, the second gain information sent by the second device on which the model partial differentiated update is performed includes gain information of some model parameters in all model parameters. The first device performs weighted summation or incremental learning on the gain information of the some model parameters in a manner described in the case C2, to obtain the third gain information corresponding to the second device on which the model partial differentiated update is performed.

It should be noted that, when the first device performs federated fusion on the second gain information based on the federated learning policy, to obtain the third gain information corresponding to each second device, if one second device corresponds to an unused federated learning policy, the first device may perform federated fusion on corresponding second gain information for the different federated learning policy. For example, the second device includes a device 1, a device 2, and a device 3. If comparison is performed on the device 1 and the device 2 and the federated learning policy is determined as model average fusion, and comparison is performed on the device 1 and the device 3 and the federated learning policy is determined as model partial differentiated update, averaging may be first performed on second gain information reported by the device 1 and second gain information reported by the device 2, and then differentiated processing is performed on an average value and second gain information reported by the device 3, where obtained gain information is third gain information corresponding to the device 1.

409: The first device separately sends the corresponding third gain information to the plurality of second devices.

For any second device, the first device directly sends the third gain information to the corresponding second device, or after obtaining the second model based on the third gain information and a first model of the corresponding second device, the first device sends the second model to the corresponding second device. For the latter case, a process of obtaining the second model is performed by the first device. The first device directly obtains the second model of each second device, and then sends the second model to each second device.

For example, compared with the first model, only a part of the model may be updated in the second model. In this case, the first device sends only an updated model part to each second device, or sends the entire model to each second device. For example, both the first model and the second model are neural network models including five convolution layers, and the first model and the second model are different only at the first convolution layer. The first device sends the first convolution layer in the second model to the second device, or sends the entire second model to the second device.

410: The second device receives the corresponding third gain information sent by the first device, or the second model obtained based on the corresponding third gain information and a first model of the second device.

For a case that the second device receives the corresponding third gain information, the second device performs summation on the corresponding third gain information and each model parameter of the first model, to obtain the second model.

In conclusion, in this embodiment of the present disclosure, each second device participating in federated learning sends respective data distribution information to the first device, so that the first device can determine distribution situations of current training samples of different second devices based on the data distribution information, that is, learn of non-independent and identically distributed degrees of the current training samples of the different second devices. The first device selects a federated learning policy based on the non-independent and identically distributed degrees, and sends a parameter reporting policy corresponding to the selected federated learning policy to each second device. In this case, each second device updates a model based on the parameter reporting policy corresponding to the federated learning policy. Therefore, interference caused to a federated learning process due to a non-independent and identically distributed phenomenon of training data between different second devices is avoided, and a model obtained by each second device through federated learning has good performance, for example, high accuracy.

Figure 7:
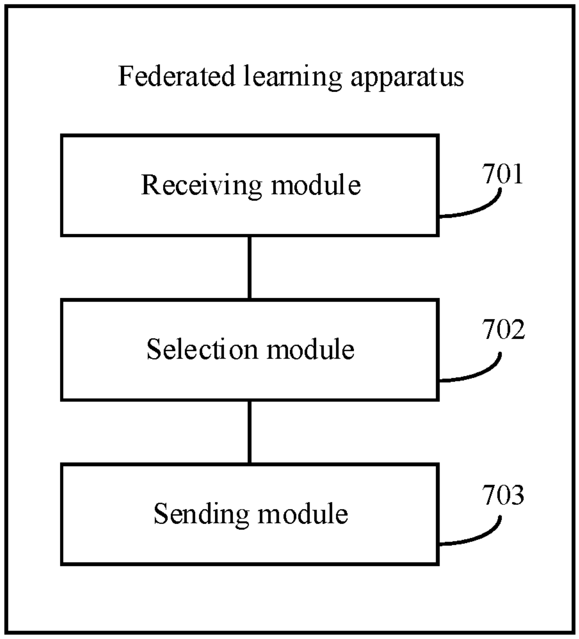
FIG. 7 is a schematic diagram of a structure of a federated learning apparatus according to an embodiment of the present disclosure.

The foregoing describes the federated learning method in embodiments of the present disclosure. Corresponding to the foregoing method, an embodiment of the present disclosure further provides a federated learning apparatus. The apparatus is configured to perform, by using modules shown in FIG. 7, the federated learning method performed by the first device in the foregoing method embodiments. As shown in FIG. 7, an embodiment of the present disclosure provides a packet transmission apparatus, including the following modules.

A receiving module 701 is configured to receive, for a first device, data distribution information sent by a plurality of second devices participating in federated learning, where data distribution information sent by any second device includes at least one of first gain information and label type information, the first gain information indicates a correction degree to a first model obtained through previous round of training to adapt to a current training sample of the any second device, and the label type information indicates a type corresponding to a label of the current training sample. For steps performed by the receiving module 701, refer to the descriptions in 403 and 408.

A selection module 702 is configured to select, for the first device, a matched federated learning policy based on the data distribution information sent by the plurality of second devices. For steps performed by the selection module 702, refer to the descriptions in 404.

A sending module 703 is configured to send, for the first device, a parameter reporting policy corresponding to the federated learning policy to at least one second device in the plurality of second devices, where any second device in the at least one second device is configured to report second gain information obtained based on the received parameter reporting policy and the current training sample, and the second gain information is for obtaining a second model of the any second device. For steps performed by the sending module 703, refer to the descriptions in 405 and 409.

In a possible implementation, the selection module 702 is configured to select, for the first device, the matched federated learning policy based on a difference between data distribution, where the difference between the data distribution is determined based on the data distribution information sent by the plurality of second devices.

In a possible implementation, the data distribution information sent by the any second device includes the first gain information and the label type information, and the apparatus further includes: a first determining module configured to: determine, for the first device, feature distribution information based on the first gain information of the plurality of second devices, where the feature distribution information indicates whether feature distribution of current training samples of different second devices is the same; and determine, for the first device, the difference between the data distribution based on the feature distribution information and the label type information of the plurality of second devices.

In a possible implementation, the selection module 702 is configured to: based on the feature distribution information indicates that the feature distribution of the current training samples of the different second devices is the same, and that the label type information of the different second devices is the same, select the matched federated learning policy as model average fusion, where the model average fusion is for performing federated learning in a gain information averaging manner.

In a possible implementation, the selection module 702 is configured to: based on the feature distribution information indicates that the feature distribution of the current training samples of the different second devices is different, and that the label type information of the different second devices is the same, select the matched federated learning policy as model differentiated update, where the model differentiated update is for performing federated learning in a gain information differentiated processing manner.

In a possible implementation, the selection module 702 is configured to: based on the feature distribution information indicates that the feature distribution of the current training samples of the different second devices is the same, and that the label type information of the different second devices is different, select the matched federated learning policy as model partial update, where the model partial update is for performing federated learning in a partial gain information averaging manner.

In a possible implementation, the selection module 702 is configured to: based on the feature distribution information indicates that the feature distribution of the current training samples of the different second devices is different, and that the label type information of the different second devices is different, select the matched federated learning policy as model partial differentiated update, where the model partial differentiated update is for performing federated learning in a partial gain information differentiated processing manner.

In a possible implementation, the data distribution information sent by the any second device includes the first gain information, and the apparatus further includes: a second determining module configured to: determine, for the first device, feature distribution information based on the first gain information of the plurality of second devices, where the feature distribution information indicates whether feature distribution of current training samples of different second devices is the same; and determine, for the first device, the difference between the data distribution based on the feature distribution information.

In a possible implementation, the selection module 702 is configured to: based on the feature distribution information indicates that the feature distribution of the current training samples of the different second devices is the same, select the matched federated learning policy as model average fusion, where the model average fusion is for performing federated learning in a gain information averaging manner.

In a possible implementation, the selection module 702 is configured to: based on the feature distribution information indicates that the feature distribution of the current training samples of the different second devices is different, select the matched federated learning policy as model differentiated update, where the model differentiated update is for performing federated learning in a gain information differentiated processing manner.

In a possible implementation, the apparatus further includes: a third determining module configured to determine the difference between the data distribution based on the label type information.

In a possible implementation, the selection module 702 is configured to: based on the label type information of different second devices is the same, select the matched federated learning policy as model average fusion, where the model average fusion is for performing federated learning in a gain information averaging manner.

In a possible implementation, the selection module 702 is configured to: based on the label type information of different second devices is different, select the matched federated learning policy as model partial update, where the model partial update is for performing federated learning in a partial gain information averaging manner.

In a possible implementation, the receiving module 701 is further configured to receive, for the first device, the second gain information sent by the plurality of second devices.

The apparatus further includes: a fusion module configured to perform, for the first device, federated fusion on the second gain information based on the federated learning policy, to obtain third gain information corresponding to each second device; and the sending module 703 is further configured to send, for the first device to the any second device in the at least one second device, the corresponding third gain information or the second model obtained based on the corresponding third gain information and a first model of the any second device.

In a possible implementation, the receiving module 701 is further configured to receive, for the first device, training sample feature information sent by the plurality of second devices, where the training sample feature information represents label distribution or a sample quantity; and the sending module 703 is further configured to send, for the first device for the any second device in the at least one second device, a hyperparameter to the any second device, where the hyperparameter is determined based on the training sample feature information sent by the any second device, and the hyperparameter is used by the any second device to obtain the second gain information.

In a possible implementation, the training sample feature information includes label distribution information or the sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes the first model of the any second device, the first gain information includes gain information corresponding to the first model of the any second device, and the gain information corresponding to the first model of the any second device indicates a correction degree to the first model of the any second device to adapt to the current training sample of the any second device; or the first model obtained through the previous round of training includes the first model of the any second device and a first model of another second device participating in federated learning, the first gain information includes gain information corresponding to the first model of the any second device and gain information corresponding to the first model of the another second device, and the gain information corresponding to the first model of the another second device indicates a correction degree to the first model of the another second device to adapt to the current training sample of the any second device.

In a possible implementation, before the first device receives the data distribution information sent by the plurality of second devices participating in federated learning, the sending module 703 is further configured to send, for the first device, the first model of the another second device to the any second device.

Figure 8:
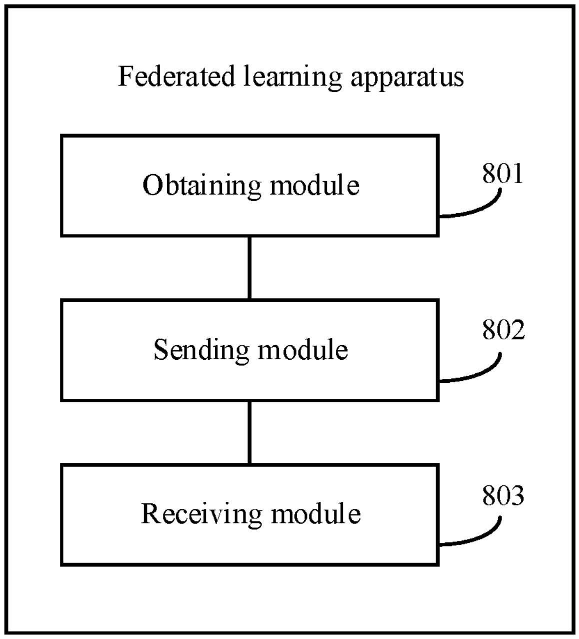
FIG. 8 is a schematic diagram of a structure of a federated learning apparatus according to an embodiment of the present disclosure.

An embodiment of the present disclosure further provides another federated learning apparatus. The apparatus is configured to perform, by using modules shown in FIG. 8, the federated learning method performed by the first device in the foregoing method embodiments. As shown in FIG. 8, an embodiment of the present disclosure provides a packet transmission apparatus, including the following modules.

An obtaining module 801 is configured to obtain, for a second device, data distribution information, where the data distribution information includes at least one of first gain information and label type information, the first gain information indicates a correction degree to a first model obtained through previous round of training to adapt to a current training sample of the second device, and the label type information indicates a type corresponding to a label of the current training sample. For steps performed by the obtaining module 801, refer to the descriptions in 401.

A sending module 802 is configured to send, for the second device, the data distribution information to a first device, where the data distribution information is used by the first device to select a matched federated learning policy. For steps performed by the sending module 802, refer to the descriptions in 402 and 407.

A receiving module 803 is configured to receive, for the second device, a parameter reporting policy that corresponds to the federated learning policy and that is sent by the first device, and obtain second gain information based on the received parameter reporting policy and the current training sample, where the second gain information is for obtaining a second model of the second device. For steps performed by the receiving module 803, refer to the descriptions in 406 and 410.

In a possible implementation, the sending module 802 is further configured to send, for the second device, the second gain information to the first device; and the receiving module 803 is further configured to receive, for the second device, corresponding third gain information sent by the first device based on the second gain information, and obtain, for the second device, the second model based on the third gain information and a first model of the second device; or receive, for the second device, the second model that is sent by the first device and that is obtained based on corresponding third gain information and a first model of the second device.

In a possible implementation, the sending module 802 is further configured to send, for the second device, training sample feature information to the first device, where the training sample feature information is used by the first device to determine a hyperparameter; and the receiving module 803 is further configured to receive, for the second device, the hyperparameter sent by the first device, and obtain the second gain information based on the received parameter reporting policy, the current training sample, and the hyperparameter.

In a possible implementation, the training sample feature information includes label distribution information or a sample quantity, where the label distribution information includes at least one of label proportion information and a quantity of labels of each type, and the label proportion information indicates a proportion of labels of each type in labels of the current training samples; and the sample quantity information indicates a quantity of samples included in the current training sample.

In a possible implementation, the first model obtained through the previous round of training includes the first model of the second device, the first gain information includes gain information corresponding to the first model of the second device, and the gain information corresponding to the first model of the second device indicates a correction degree to the first model of the second device to adapt to the current training sample of the second device; or the first model obtained through the previous round of training includes the first model of the second device and a first model of another second device participating in federated learning, the first gain information includes gain information corresponding to the first model of the second device and gain information corresponding to the first model of the another second device, and the gain information corresponding to the first model of the another second device indicates a correction degree to the first model of the another second device to adapt to the current training sample of the second device.

In a possible implementation, the receiving module 803 is further configured to receive, for the second device, the first model of the another second device that is sent by the first device.

In conclusion, in this embodiment of the present disclosure, each second device participating in federated learning sends respective data distribution information to the first device, so that the first device can determine distribution situations of current training samples of different second devices based on the data distribution information, that is, learn of non-independent and identically distributed degrees of the current training samples of the different second devices. The first device selects a federated learning policy based on the non-independent and identically distributed degrees, and sends the selected federated learning policy to each second device. In this case, each second device updates a model based on the federated learning policy. Therefore, interference caused to a federated learning process due to a non-independent and identically distributed phenomenon of training data between different second devices is avoided, and a model obtained by each second device through federated learning has good performance, for example, high accuracy.

It should be understood that, when the packet transmission apparatuses in FIG. 7 and FIG. 8 implement functions of the packet transmission apparatuses, division of the foregoing functional modules is merely used as an example for description. In an actual application, the foregoing functions may be allocated to different functional modules for implementation as required, that is, an internal structure of a device is divided into different functional modules to implement all or some of the functions described above. In addition, the apparatuses provided in the foregoing embodiments and the method embodiments belong to the same concept. For a specific implementation process of the apparatuses, refer to the method embodiments.

Figure 9:
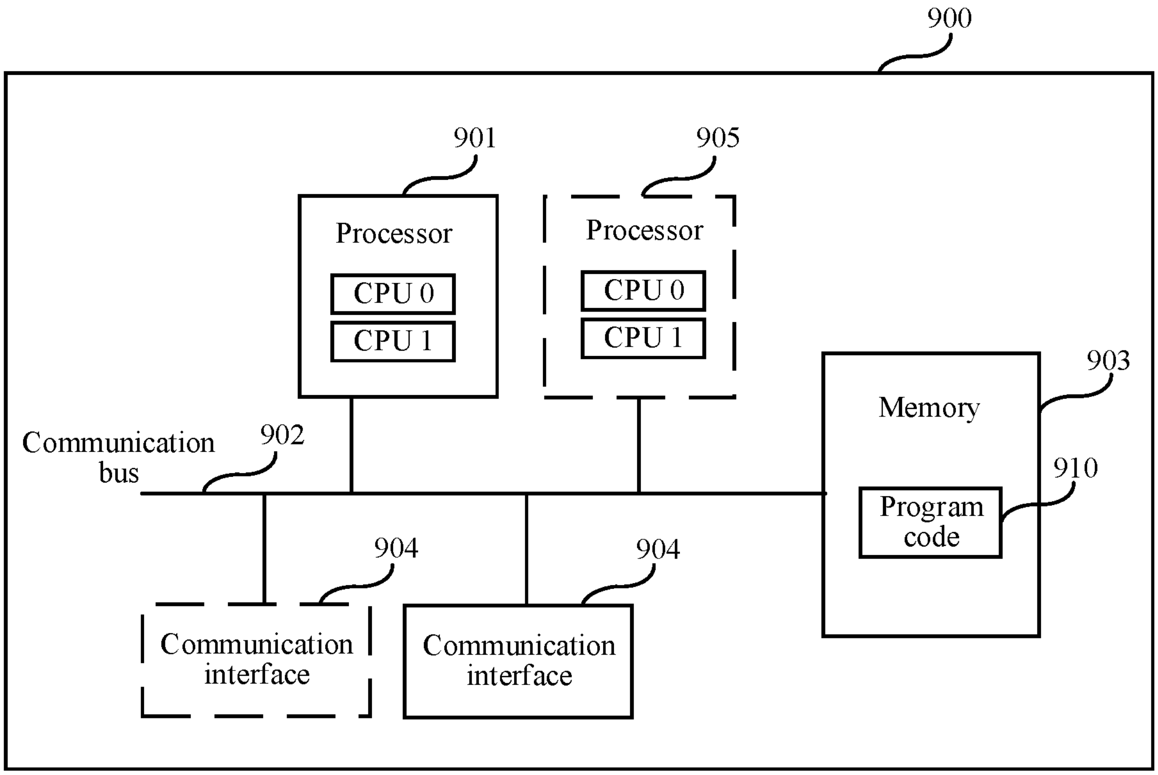
FIG. 9 is a schematic diagram of a structure of a communication device according to an embodiment of the present disclosure.

Refer to FIG. 9. FIG. 9 is a schematic diagram of a structure of a communication device 900 according to an example embodiment of the present disclosure. The communication device 900 shown in FIG. 9 is configured to perform operations related to the federated learning method shown in FIG. 4 or FIG. 6. The communication device 900 is, for example, a switch, a router, or a controller. The communication device 900 may be implemented by using a general bus structure.

As shown in FIG. 9, the communication device 900 includes at least one processor 901, a memory 903, and at least one communication interface 904.

The processor 901 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of the present disclosure. For example, the processor 901 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present disclosure. Alternatively, the processor may be a combination for implementing a computing function, for example, including a combination of one or more microprocessors, or a combination of a DSP and a microprocessor.

Optionally, the communication device 900 further includes a bus. The bus is configured to transmit information between components of the communication device 900. The bus may be a Peripheral Component Interconnect (PCI) bus, an Extended Industry Standard Architecture (EISA) bus, or the like. The bus may be classified into an address bus, a data bus, a control bus, and the like. For ease of representation, only one bold line is used to represent the bus in FIG. 9, but this does not mean that there is only one bus or only one type of bus.

The memory 903 is, for example, a (ROM or another type of static storage device that can store static information and instructions, a random-access memory (RAM) or another type of dynamic storage device that can store information and instructions, or an electrically erasable programmable ROM (EEPROM), a compact disc ROM (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory is not limited thereto. For example, the memory 903 exists independently, and is connected to the processor 901 through the bus. Alternatively, the memory 903 and the processor 901 may be integrated together.

The communication interface 904 uses any apparatus such as a transceiver, and is configured to communicate with another device or a communication network. The communication network may be the Ethernet, a radio access network (RAN), a wireless local area network (WLAN), or the like. The communication interface 904 may include a wired communication interface, and may further include a wireless communication interface. Specifically, the communication interface 904 may be an Ethernet interface, a Fast Ethernet (FE) interface, a Gigabit Ethernet (GE) interface, an asynchronous transfer mode (ATM) interface, a (WLAN interface, a cellular network communication interface, or a combination thereof. The Ethernet interface may be an optical interface, an electrical interface, or a combination thereof. In this embodiment of the present disclosure, the communication interface 904 may be used by the communication device 900 to communicate with another device.

During a specific implementation, in an embodiment, the processor 901 may include one or more CPUs, for example, a CPU 0 and a CPU 1 shown in FIG. 9. Each of the processors may be a single-core (single-CPU) processor, or may be a multi-core (multi-CPU) processor. The processor herein may be one or more devices, circuits, and/or processing cores configured to process data (e.g., computer program instructions).

In a specific implementation, in an embodiment, the communication device 900 may include a plurality of processors, for example, a processor 901 and a processor 905 shown in FIG. 9. Each of the processors may be a single-core processor (single-CPU) or a multi-core processor (multi-CPU). The processor herein may be one or more devices, circuits, and/or processing cores configured to process data (e.g., computer program instructions).

In a specific implementation, in an embodiment, the communication device 900 may further include an output device and an input device. The output device communicates with the processor 901, and may display information in a plurality of manners. For example, the output device may be a liquid-crystal display (LCD), a light-emitting diode (LED) display device, a cathode ray tube (CRT) display device, or a projector. The input device communicates with the processor 901, and may receive an input from a user in a plurality of manners. For example, the input device may be a mouse, a keyboard, a touchscreen device, or a sensing device.

In some embodiments, the memory 903 is configured to store program code 910 for executing the solutions of the present disclosure, and the processor 901 may execute the program code 910 stored in the memory 903. In other words, the communication device 900 may implement, by using the processor 901 and the program code 910 in the memory 903, the federated learning method provided in the method embodiments. The program code 910 may include one or more software modules. Optionally, the processor 901 may alternatively store program code or instructions for executing the solutions of the present disclosure.

In a specific embodiment, the communication device 900 in this embodiment of the present disclosure may correspond to the first device or the second device in the foregoing method embodiments. The processor 901 in the communication device 900 reads the instructions in the memory 903, so that the communication device 900 shown in FIG. 9 can perform all or some operations performed by the first device or the second device in the method embodiments.

The communication device 900 may alternatively correspond to the apparatus shown in FIG. 7. Each functional module in the apparatus shown in FIG. 7 is implemented by using software of the communication device 900. In other words, the functional modules included in the apparatus shown in FIG. 7 are generated after the processor 901 of the communication device 900 reads the program code 910 stored in the memory 903.

The communication device 900 may alternatively correspond to the apparatus shown in FIG. 8. Each functional module in the apparatus shown in FIG. 8 is implemented by using software of the communication device 900. In other words, the functional modules included in the apparatus shown in FIG. 8 are generated after the processor 901 of the communication device 900 reads the program code 910 stored in the memory 903.

The steps of the federated learning methods shown in FIG. 4 and FIG. 6 are completed by using an integrated logic circuit of hardware in a processor of the communication device 900 or an instruction in a form of software. The steps of the methods disclosed with reference to embodiments of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

In some possible embodiments, the communication device may be implemented as a virtualization device.

For example, the virtualization device may be a virtual machine (VM) on which a program having a packet sending function is run, and the virtual machine is deployed on a hardware device (e.g., a physical server). The virtual machine is a complete software-simulated computer system that has complete hardware system functions and that runs in an entirely isolated environment. The virtual machine may be configured to be a first communication device or a second communication device. For example, the communication device may be implemented based on a general-purpose physical server in combination with a network function virtualization (NFV) technology. The communication device is a virtual host, a virtual router, or a virtual switch. After reading the present disclosure, with reference to the NFV technology, a person skilled in the art may virtualize a communication device having the foregoing functions on a general-purpose physical server. Details are not described herein.

For example, the virtualization device may be a container, and the container is an entity configured to provide an isolated virtualization environment. For example, the container may be a docker container. The container may be configured as a communication device. For example, the communication device may be created by using a corresponding mirror. For example, 2 container instances may be created for a proxy-container by using a mirror of the proxy-container (a container that provides a proxy service), which are a container instance proxy-container1 and a container instance proxy-container2 respectively. The container instance proxy-container1 is provided as the first device in the foregoing method embodiments, and the container instance proxy-container2 is provided as the second device in the foregoing method embodiments. When the communication device is implemented by using the container technology, the communication device may run by using a kernel of a physical machine, and a plurality of communication devices may share an operating system of the physical machine. Different communication devices can be isolated by using the container technology. The containerized communication device may run in a virtualization environment, for example, may run in a virtual machine, or the containerized communication device may directly run in a physical machine.

For example, the virtualization device may be a pod. The pod is a basic unit of Kubernetes (Kubernetes is an open-source container orchestration engine of Google, which is referred to as K10s for short) for deploying, managing, and orchestrating a containerized present disclosure. The pod may include one or more containers. All containers in a same pod are usually deployed on a same host. Therefore, all the containers in the same pod may communicate with each other via a host, and may share storage resources and network resources of the host. The pod may be configured as a communication device. For example, specifically, a container as a service (container as a service, CaaS for short, which is a container-based PaaS service) may be instructed to create a pod, and the pod is provided as a communication device.

Certainly, the communication device may alternatively be another virtualization device, and details are not listed herein.

In some possible embodiments, the communication device may also be implemented by a general-purpose processor.

For example, the general-purpose processor may be in a form of a chip. Specifically, the general-purpose processor implementing the communication device includes a processing circuit, and an input interface and an output interface that are internally connected to and communicate with the processing circuit. The processing circuit is configured to perform the packet generation step in the foregoing method embodiments by using the input interface. The processing circuit is configured to perform the receiving step in the foregoing method embodiments by using the input interface. The processing circuit is configured to perform the sending step in the foregoing method embodiments by using the output interface. Optionally, the general-purpose processor may further include a storage medium. The processing circuit is configured to perform the storing step in the foregoing method embodiments by using the storage medium. The storage medium may store instructions to be executed by the processing circuit. The processing circuit is configured to execute the instructions stored in the storage medium, to perform the foregoing method embodiments.

It should be understood that the processor may be a CPU, or may be another general-purpose processor, a DSP, an ASIC, an FPGA or another programmable logic device, a discrete gate or a transistor logic device, a discrete hardware component, or the like. The general-purpose processor may be a microprocessor or any conventional processor. It should be noted that the processor may be a processor that supports an advanced reduced instruction set computer machine (ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both a volatile memory and a non-volatile memory. The non-volatile memory may be a ROM, a programmable ROM (PROM), an EPROM, an electrically EPROM (EEPROM), or a flash memory. The volatile memory may be a (RAM, used as an external cache. By way of example but not limitation, many forms of RAMs are available, for example, a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), and a direct Rambus RAM (DR RAM).

An embodiment of the present disclosure provides a federated learning system. The federated learning system includes a first communication device and a plurality of second communication devices. Optionally, the first communication device is configured to perform the method performed by the first device in the foregoing method embodiments, and each second communication device is configured to perform the method performed by the second device in the foregoing method embodiments.

An embodiment of the present disclosure provides a computer program product. The computer program product includes computer program code. When the computer program code is run by a computer, the computer is enabled to perform the federated learning method performed by the first device or the second device in the foregoing method embodiments.

An embodiment of the present disclosure provides a computer-readable storage medium. The computer-readable storage medium stores a program or instructions. When the program or the instructions are run on a computer, the federated learning method performed by the first device or the second device in the foregoing method embodiments is performed.

An embodiment of the present disclosure provides a chip, including a processor configured to invoke, from a memory, an instruction stored in the memory and run the instruction, so that a communication device in which the chip is installed performs the federated learning method performed by the first device or the second device in the foregoing method embodiments.

An embodiment of the present disclosure provides another chip, including an input interface, an output interface, a processor, and a memory. The input interface, the output interface, the processor, and the memory are connected by using an internal connection path. The processor is configured to execute code in the memory. When the code is executed, the processor is configured to perform the federated learning method performed by the first device or the second device in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the present disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line) or wireless (e.g., infrared, radio, or microwave) manner. The computer-readable storage medium may be any usable medium accessible by the computer, or a data storage device, for example, a server or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid state disk (SSD)), or the like.

In the context of embodiments of the present disclosure, the computer program code or related data may be carried by any appropriate carrier, so that a device, an apparatus, or a processor can perform various processing and operations described above. Examples of the carrier include a signal, a computer-readable medium, and the like.

Examples of the signal may include propagated signals in electrical, optical, radio, sound, or other forms, such as a carrier and an infrared signal.

A machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a RAM, a ROM, an EPROM or a flash memory, an optical storage device, a magnetic storage device, or any suitable combination thereof.

It may be clearly understood by a person skilled in the art that, for the purpose of convenient and brief description, for a specific working process of the foregoing described system, device, and module, refer to a corresponding process in the foregoing method embodiments.

In the several embodiments provided in the present disclosure, it should be understood that the disclosed system, device, and method may be implemented in other manners. For example, the described device embodiment is merely an example. For example, division of the modules is merely logical function division and there may be other division manners during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of the present disclosure.

In addition, functional modules in embodiments of the present disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

In the present disclosure, the terms "first", "second", and the like are for distinguishing between same or similar items whose effects and functions are basically the same. It should be understood that there is no logical or time-sequence dependency between "first", "second", and "nth", and a quantity and an execution sequence are also not limited. It should also be understood that although terms such as first and second are used in the following descriptions to describe various elements, these elements should not be limited by the terms. These terms are merely for distinguishing one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of the present disclosure. The execution sequences of the processes should be determined based on functions and internal logic of the processes, and should not be construed as any limitation on the implementation processes of embodiments of the present disclosure.

In the present disclosure, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or groups thereof not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (the stated condition or event) is detected" or "in response to detecting (the stated condition or event)".

It should be understood that determining B based on A does not mean that B is determined based on only A, and B may alternatively be determined based on A and/or other information.

It should be further understood that "one embodiment", "an embodiment", or "a possible implementation" mentioned throughout this specification means that particular features, structures, or characteristics related to the embodiment or implementation are included in at least one embodiment of the present disclosure. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

The foregoing descriptions are merely embodiments of the present disclosure, but are not intended to limit the present disclosure. Any modification, equivalent replacement, or improvement made without departing from the spirit and principle of the present disclosure should fall within the protection scope of this application.

What is claimed is:

1. A method implemented by a first device, the method comprising:

for one round of a training process:

receiving data distribution information from a plurality of second devices participating in federated learning, wherein the data distribution information comprises both first gain information and label type information, wherein the first gain information indicates a first correction degree for a first model obtained through a previous round of training to adapt to a current training sample of a second device of the plurality of second devices, and wherein the label type information indicates a type corresponding to a label of the current training sample;

determining feature distribution information based on the first gain information, wherein the feature distribution information indicates whether feature distribution of current training samples of different second devices is the same, wherein determining the feature distribution information comprises computing a distance between the first gain information of different second devices;

determining a difference between data distribution of the plurality of second devices based on the feature distribution information and the label type information;

selecting a matched federated learning policy based on the difference between the data distribution; and sending a parameter reporting policy corresponding to the matched federated learning policy to at least one second device in the plurality of second devices.

2. The method of claim 1, wherein the first gain information comprises at least one of gradient information of a neural network model or split information of a decision tree model, wherein the gradient information indicates a gradient of a loss function of the first model with respect to model parameters, and wherein the split information indicates a split condition used by the decision tree model to partition the current training sample.

3. The method of claim 2, wherein computing the distance between the first gain information of different second devices comprises computing a similarity metric between the first gain information of a first second device and the first gain information of a second device, and wherein determining whether the feature distribution of current training samples of different second devices is the same comprises comparing the distance to a predetermined threshold, wherein the feature distribution is determined to be the same when the distance is below the predetermined threshold and different when the distance is at or above the predetermined threshold.

4. The method of claim 3, wherein selecting the matched federated learning policy comprises selecting a model average fusion as the matched federated learning policy when the feature distribution information indicates that the feature distribution of the current training samples is the same and that the label type information is the same, and wherein the model average fusion is for performing federated learning in a gain information averaging manner.

5. The method of claim 3, wherein selecting the matched federated learning policy comprises selecting a model differentiated update as the matched federated learning policy when the feature distribution information indicates that the feature distribution is different and that the label type information is the same, and wherein the model differentiated update is for performing federated learning in a gain information differentiated processing manner.

6. The method of claim 3, wherein selecting the matched federated learning policy comprises selecting a model partial update as the matched federated learning policy when the feature distribution information indicates that the feature distribution is the same and that the label type information is different, and wherein the model partial update is for performing federated learning in a partial gain information averaging manner.

7. The method of claim 3, wherein selecting the matched federated learning policy comprises selecting a model partial differentiated update as the matched federated learning policy when the feature distribution information indicates that the feature distribution is different and that the label type information is different, and wherein the model partial differentiated update is for performing federated learning in a partial gain information differentiated processing manner.

8. The method of claim 2, wherein the data distribution information further comprises the first gain information, and wherein prior to selecting the matched federated learning policy, the method further comprises:

determining feature distribution information based on the first gain information of the plurality of second devices, wherein the feature distribution information indicates whether feature distribution of current training samples of different second devices is the same; and determining the difference between the data distribution based on the feature distribution information.

9. The method of claim 1, further comprising:

receiving second gain information from the plurality of second devices, wherein the second gain information is based on the parameter reporting policy and the current training sample;

performing federated fusion on the second gain information based on the matched federated learning policy to obtain third gain information corresponding to each second device; and sending, to the second device in the at least one second device, the third gain information corresponding to the second device or a second model based on the third gain information and the first model of the second device.

10. The method of claim 9, wherein prior to sending the parameter reporting policy, the method further comprises receiving training sample feature information from the plurality of second devices, wherein the training sample feature information represents label distribution information or a sample quantity, and wherein sending the parameter reporting policy corresponding to the matched federated learning policy to the at least one second device comprises sending, to a second device in the at least one second device, a hyperparameter for obtaining the second gain information, and wherein the hyperparameter is based on the training sample feature information from the second device.

11. The method of claim 10, wherein the training sample feature information comprises the label distribution information or the sample quantity, wherein the label distribution information comprises at least one of label proportion information or a first quantity of labels of each type, wherein the label proportion information indicates a proportion of labels of each type in labels of the current training samples, and wherein the sample quantity indicates a second quantity of samples comprised in the current training sample.

12. The method of claim 1, wherein the first model comprises a second first model of a second device, wherein the first gain information comprises second gain information corresponding to the second first model, and wherein the second gain information indicates a second correction degree to the second first model to adapt to the current training sample of the second device.

13. The method of claim 1, wherein the first model comprises a second first model of a second device and a third first model of another second device participating in federated learning, wherein the first gain information comprises second gain information corresponding to the second first model and third gain information corresponding to the third first model, and wherein the second gain information indicates a second correction degree to the second first model to adapt to the current training sample of the second device.

14. The method of claim 13, further comprising sending, prior to receiving the data distribution information, the third first model to the second device.

15. A first device comprising:

a memory configured to store instructions; and one or more processors coupled to the memory and configured to execute the instructions to cause the first device to:

for one round of a training process:

receive data distribution information from a plurality of second devices participating in federated learning, wherein data distribution information from any second device comprises both first gain information and label type information, the first gain information indicates a correction degree for a first model obtained through a previous round of training to adapt to a current training sample of the any second device of the plurality of second devices, and wherein the label type information indicates a type corresponding to a label of the current training sample;

determine feature distribution information based on the first gain information, wherein the feature distribution information indicates whether feature distribution of current training samples of different second devices is the same, wherein determining the feature distribution information comprises computing a distance between the first gain information of different second devices;

determine a difference between data distribution of the plurality of second devices based on the feature distribution information and the label type information;

select a matched federated learning policy based on the difference between the data distribution; and send a parameter reporting policy corresponding to the matched federated learning policy to at least one second device in the plurality of second devices.

16. The first device of claim 15, wherein the first gain information comprises at least one of gradient information of a neural network model or split information of a decision tree model, wherein the gradient information indicates a gradient of a loss function of the first model with respect to model parameters, and wherein the split information indicates a split condition used by the decision tree model to partition the current training sample.

17. The first device of claim 16, wherein computing the distance between the first gain information of different second devices comprises computing a similarity metric between the first gain information of a first second device and the first gain information of a second device, and wherein determining whether the feature distribution of current training samples of different second devices is the same comprises comparing the distance to a predetermined threshold, wherein the feature distribution is determined to be the same when the distance is below the predetermined threshold and different when the distance is at or above the predetermined threshold.

18. The first device of claim 17, wherein the one or more processors are configured to execute the instructions to further cause the first device to select a model average fusion as the matched federated learning policy when the feature distribution information indicates that the feature distribution is the same, and that the label type information is the same, and wherein the model average fusion is for performing federated learning in a gain information averaging manner.

19. A federated learning system comprising:

a first device comprising a first memory configured to store first instructions; and one or more first processors coupled to the first memory and configured to execute the first instructions to cause the first device to:

for one round of a training process:

receive data distribution information from a plurality of second devices participating in federated learning, wherein data distribution information from any second device comprises both first gain information and label type information, the first gain information indicates a correction degree for a first model obtained through a previous round of training to adapt to a current training sample of the any second device of the plurality of second devices, and wherein the label type information indicates a type corresponding to a label of the current training sample;

determine feature distribution information based on the first gain information, wherein the feature distribution information indicates whether feature distribution of current training samples of different second devices is the same, wherein determining the feature distribution information comprises computing a distance between the first gain information of different second devices;

determine a difference between data distribution of the plurality of second devices based on the feature distribution information and the label type information;

select a matched federated learning policy based on the difference between the data distribution; and send a parameter reporting policy corresponding to the matched federated learning policy to at least one second device in the plurality of second devices; and a second device comprising a second memory configured to store second instructions; and one or more second processors coupled to the second memory and configured to execute the second instructions to cause the second device to:

obtain the data distribution information;

send the data distribution information to the first device;

receive a parameter reporting policy that corresponds to the matched federated learning policy from the first device; obtain second gain information based on the parameter reporting policy and the current training sample; and obtain a second model of the second device based on the second gain information.

20. The federated learning system of claim 19, wherein the first gain information comprises at least one of gradient information of a neural network model or split information of a decision tree model, wherein the gradient information indicates a gradient of a loss function of the first model with respect to model parameters, and wherein the split information indicates a split condition used by the decision tree model to partition the current training sample.

* * * * *